(12) United States Patent
Yapici et al.

(10) Patent No.: US 12,457,546 B2
(45) Date of Patent: Oct. 28, 2025

(54) FRESHNESS WINDOW FOR SYSTEM INFORMATION BLOCK AND SIGNATURE

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 18/064,820

(22) Filed: Dec. 12, 2022

(65) Prior Publication Data

US 2024/0196309 A1    Jun. 13, 2024

(51) Int. Cl.
*H04W 48/08*    (2009.01)
(52) U.S. Cl.
CPC .................................. *H04W 48/08* (2013.01)

(58) Field of Classification Search
CPC ............................. H04W 76/27; Y02D 30/70
USPC ........................................................ 455/422.1
See application file for complete search history.

(56) References Cited

U.S. PATENT DOCUMENTS

| 2011/0194428 A1* | 8/2011 | Wang .................... H04W 72/30 370/312 |
| 2023/0308877 A1* | 9/2023 | Morchon .............. H04L 9/3247 |
| 2023/0388871 A1* | 11/2023 | Guo .................. H04W 36/0069 |

* cited by examiner

*Primary Examiner* — Fabricio R Murillo Garcia
(74) *Attorney, Agent, or Firm* — Harrity & Harrity LLP

(57) ABSTRACT

Various aspects of the present disclosure generally relate to wireless communication. In some aspects, a network node may identify a freshness window for a system information block and a signature that corresponds to the system information block, the freshness window having a duration that is less than a duration of a modification period for the system information block. The network node may transmit the system information block and the signature within the freshness window. Numerous other aspects are described.

30 Claims, 16 Drawing Sheets

FRESHNESS WINDOW FOR SYSTEM INFORMATION BLOCK AND SIGNATURE

FIELD OF THE DISCLOSURE

Aspects of the present disclosure generally relate to wireless communication and to techniques and apparatuses for a freshness window for a system information block and signature.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
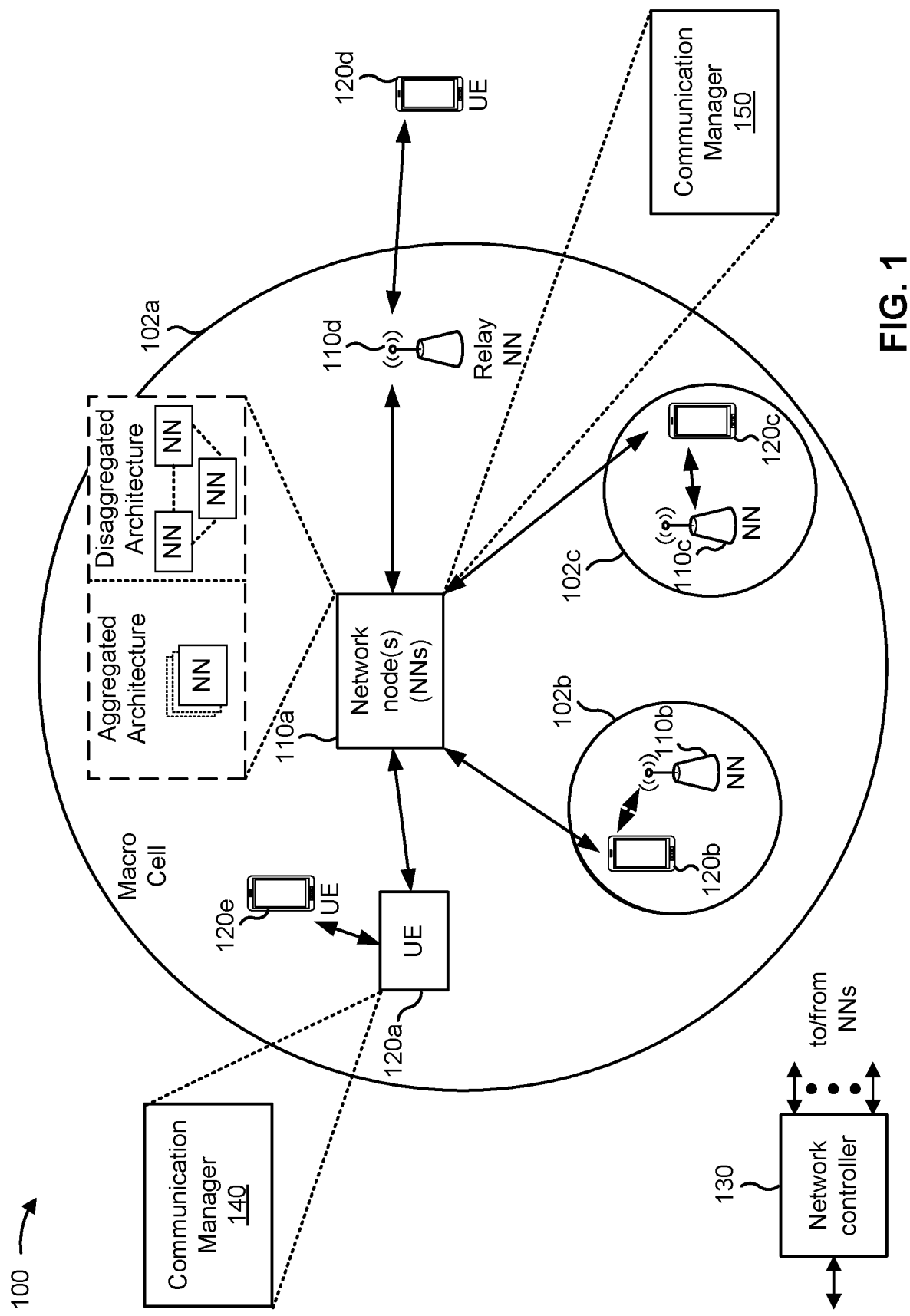
FIG. 1 is a diagram illustrating an example of a wireless network, in accordance with the present disclosure.

Some aspects described herein relate to a method of wireless communication performed by a network node. The method may include identifying a freshness window for a system information block and a signature that corresponds to the system information block, the freshness window having a duration that is less than a duration of a modification period for the system information block. The method may include transmitting the system information block and the signature within the freshness window.

Some aspects described herein relate to a method of wireless communication performed by a user equipment (UE). The method may include obtaining an indication of a freshness window for a system information block and a signature that corresponds to the system information block, the freshness window having a duration that is less than a duration of a modification period for the system information block. The method may include receiving the system information block and the signature within the freshness window.

Some aspects described herein relate to an apparatus for wireless communication performed by a network node. The apparatus may include a memory and one or more processors, coupled to the memory. The one or more processors may be configured to identify a freshness window for a system information block and a signature that corresponds to the system information block, the freshness window having a duration that is less than a duration of a modification period for the system information block. The one or more processors may be configured to transmit the system information block and the signature within the freshness window.

Some aspects described herein relate to an apparatus for wireless communication performed by a UE. The apparatus may include a memory and one or more processors, coupled to the memory. The one or more processors may be configured to obtain an indication of a freshness window for a system information block and a signature that corresponds to the system information block, the freshness window having a duration that is less than a duration of a modification period for the system information block. The one or more processors may be configured to receive the system information block and the signature within the freshness window.

Some aspects described herein relate to a non-transitory computer-readable medium that stores a set of instructions for wireless communication by a network node. The set of instructions, when executed by one or more processors of the network node, may cause the network node to identify a freshness window for a system information block and a signature that corresponds to the system information block, the freshness window having a duration that is less than a duration of a modification period for the system information block. The set of instructions, when executed by one or more processors of the network node, may cause the network node to transmit the system information block and the signature within the freshness window.

Some aspects described herein relate to a non-transitory computer-readable medium that stores a set of instructions for wireless communication by a UE. The set of instructions, when executed by one or more processors of the UE, may cause the UE to obtain an indication of a freshness window for a system information block and a signature that corresponds to the system information block, the freshness window having a duration that is less than a duration of a modification period for the system information block. The set of instructions, when executed by one or more processors of the UE, may cause the UE to receive the system information block and the signature within the freshness window.

Some aspects described herein relate to an apparatus for wireless communication. The apparatus may include means for identifying a freshness window for a system information block and a signature that corresponds to the system information block, the freshness window having a duration that is less than a duration of a modification period for the system information block. The apparatus may include means for transmitting the system information block and the signature within the freshness window.

Some aspects described herein relate to an apparatus for wireless communication. The apparatus may include means for obtaining an indication of a freshness window for a system information block and a signature that corresponds to the system information block, the freshness window having a duration that is less than a duration of a modification period for the system information block. The apparatus may include means for receiving the system information block and the signature within the freshness window.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the network node 110 may include a communication manager 150. As described in more detail elsewhere herein, the communication manager 150 may identify a freshness window for a system information block and a signature that corresponds to the system information block, the freshness window having a duration that is less than a duration of a modification period for the system information block; and transmit the system information block and the signature within the freshness window. In some aspects, the freshness window may be based at least in part on a time period during which a payload associated with the system information block does not change (e.g., is static) or is not expected to change. In some aspects, the freshness window may be based at least in part on a time period during which the signature is sufficient to prevent replay attacks. For example, the freshness window may be based at least in part on a time period during which the signature is sufficient to prevent all replay attacks or a threshold number or percentage of replay attacks. A replay attack may be a form of network attack in which a valid data transmission is maliciously or fraudulently repeated or delayed. This may be carried out by the originator of the valid data transmission (such as the network node 110) or by an adversary (such as a false network node (FNN)) that intercepts the data and re-transmits it, for example, as part of a spoofing attack. In some aspects, the freshness window may be calculated based at least in part on a capability or attribute of the FNN that generates the replay attacks or is capable of generating the replay attacks, such as a location of the FNN or a baseband processing capability of the FNN, among other examples. In some aspects, the freshness window may be short enough to reduce the likelihood of replay attacks, but may be long enough to prevent large increases to system overhead. For example, a smaller freshness window may be more likely to prevent replay attacks but may require a larger number of signature calculations. In some aspects, the freshness window may be based at least in part on the modification period for the SIB1, the time period during which the payload associated with the SIB1 does not change or is not expected to change, the time period during which the signature is sufficient to prevent the number of percentage of replay attacks, and/or the capabilities or attributes of the FNN, among other examples. Additionally, or alternatively, the communication manager 150 may perform one or more other operations described herein.

In some aspects, the UE 120 may include a communication manager 140. As described in more detail elsewhere herein, the communication manager 140 may obtain an indication of a freshness window for a system information block and a signature that corresponds to the system information block, the freshness window having the duration that is less than the duration of the modification period for the system information block; and receive the system information block and the signature within the freshness window. Additionally, or alternatively, the communication manager 140 may perform one or more other operations described herein.

As indicated above, FIG. 1 is provided as an example. Other examples may differ from what is described with regard to FIG. 1.

Figure 2:
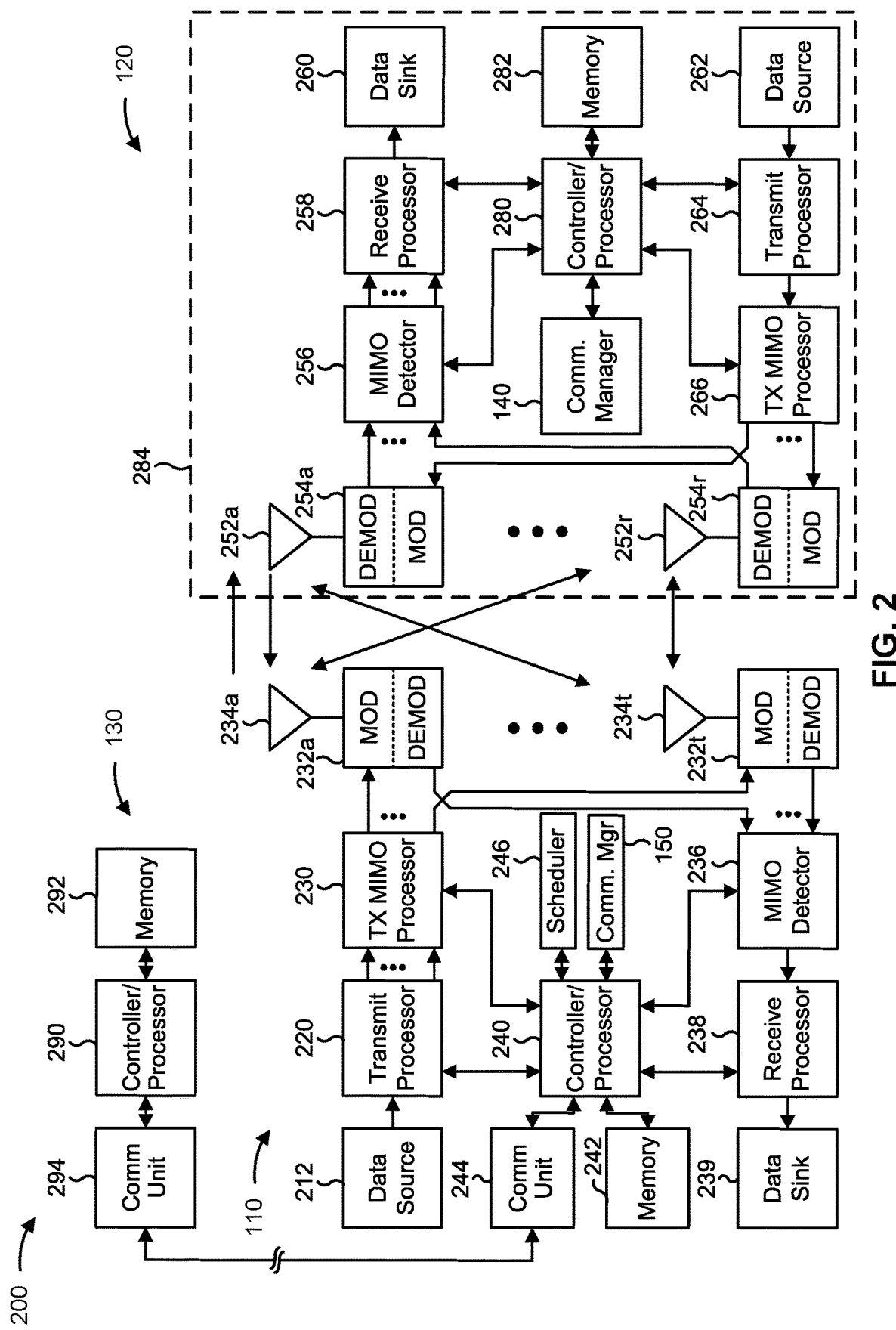
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-14).

The controller/processor 240 of the network node 110, the controller/processor 280 of the UE 120, and/or any other component(s) of FIG. 2 may perform one or more techniques associated with a freshness window for a system information block and signature, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the network node 110 includes means for identifying a freshness window for a system information block and a signature that corresponds to the system information block, the freshness window having a duration that is less than a duration of a modification period for the system information block; and/or means for transmitting the system information block and the signature within the freshness window. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for obtaining an indication of a freshness window for a system information block and a signature that corresponds to the system information block, the freshness window having a duration that is less than a duration of a modification period for the system information block; and/or means for receiving the system information block and the signature within the freshness window. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
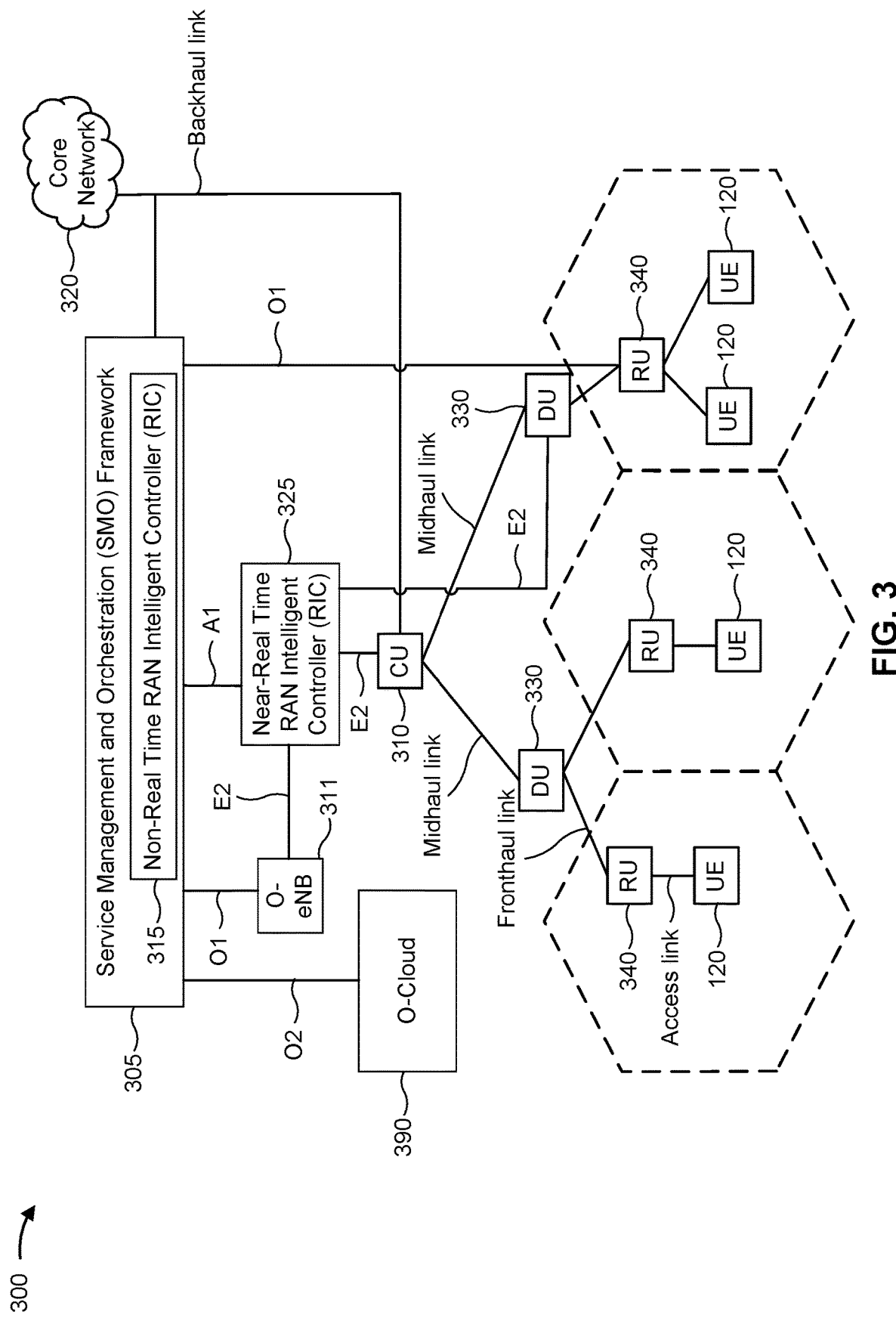
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
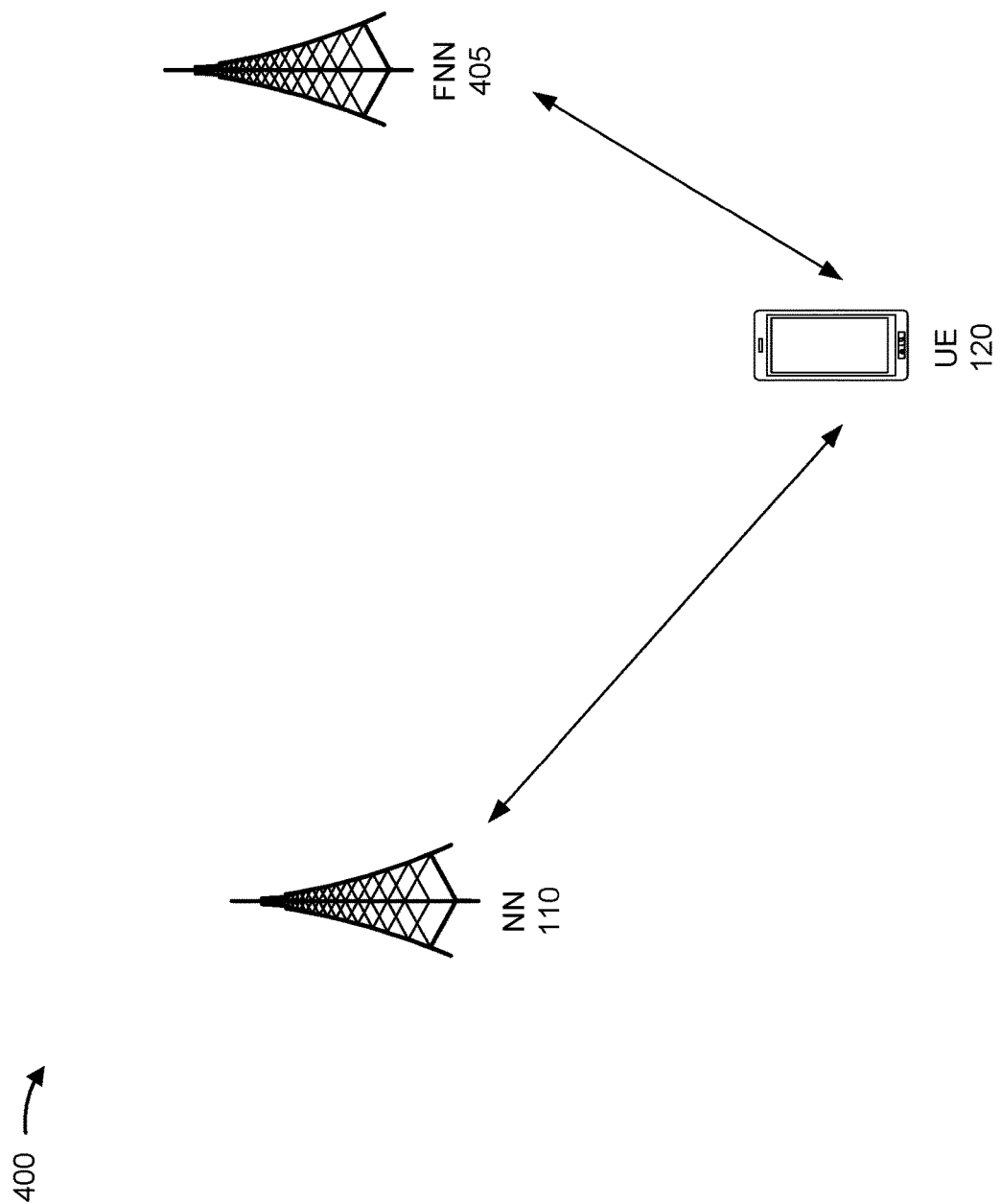
FIG. 4 is a diagram illustrating an example of false network node communications, in accordance with the present disclosure.

FIG. 4 is a diagram illustrating an example 400 of false network node communications, in accordance with the present disclosure. The UE 120 may communicate with the network node 110. For example, the network node 110 may transmit (e.g., via broadcast) a system information block (SIB), such as a SIB type 1 (SIB1), to the UE 120. Additionally, the UE 120 may communicate with a false network node (FNN) 405, which may be or may include a false base station. In some cases, the FNN 405 may pose a threat using broadcast messages (e.g., system information (SI)) at any phase of communication and/or using unicast signaling (e.g., prior to authentication). For example, the FNN 405 may transmit fake SI, which may be newly generated fake SI or may be a modified or unmodified version of a previously transmitted genuine SI, to cause a denial-of-service (DoS). In some cases, there may be no security protection (e.g., authenticity check) that enables the UE 120 to distinguish between fake broadcast messages (e.g., sent by the FNN 405) and genuine broadcast messages (e.g., sent by the network node 110) before relying on the enclosed payload in the broadcast message. This may result in reduced security by the UE 120 and an increased vulnerability of the UE 120 to replay attacks.

Methods and systems are described herein for a freshness window for a system information block and signature. In some aspects, the network node 110 may identify a freshness window for a SIB and a signature that corresponds to the SIB. The freshness window may have a duration that is less than a duration of a modification period for the system information block. In some aspects, the freshness window may indicate a time duration over which a SIB1 payload does not change, and the same signature (prepared for the SIB1) is sufficient to prevent a replay attack without updating the signature. The network node 110 may transmit the SIB and the signature to the UE 120 within the freshness window. For example, the network node 110 may broadcast the SIB and the signature within the freshness window. The UE 120 may authenticate the SIB based at least in part on the signature and the freshness window. This may improve the security of the UE 120 and may reduce a vulnerability of the UE 120 to replay attacks.

As indicated above, FIG. 4 is provided as an example. Other examples may differ from what is described with regard to FIG. 4.

Figure 5:
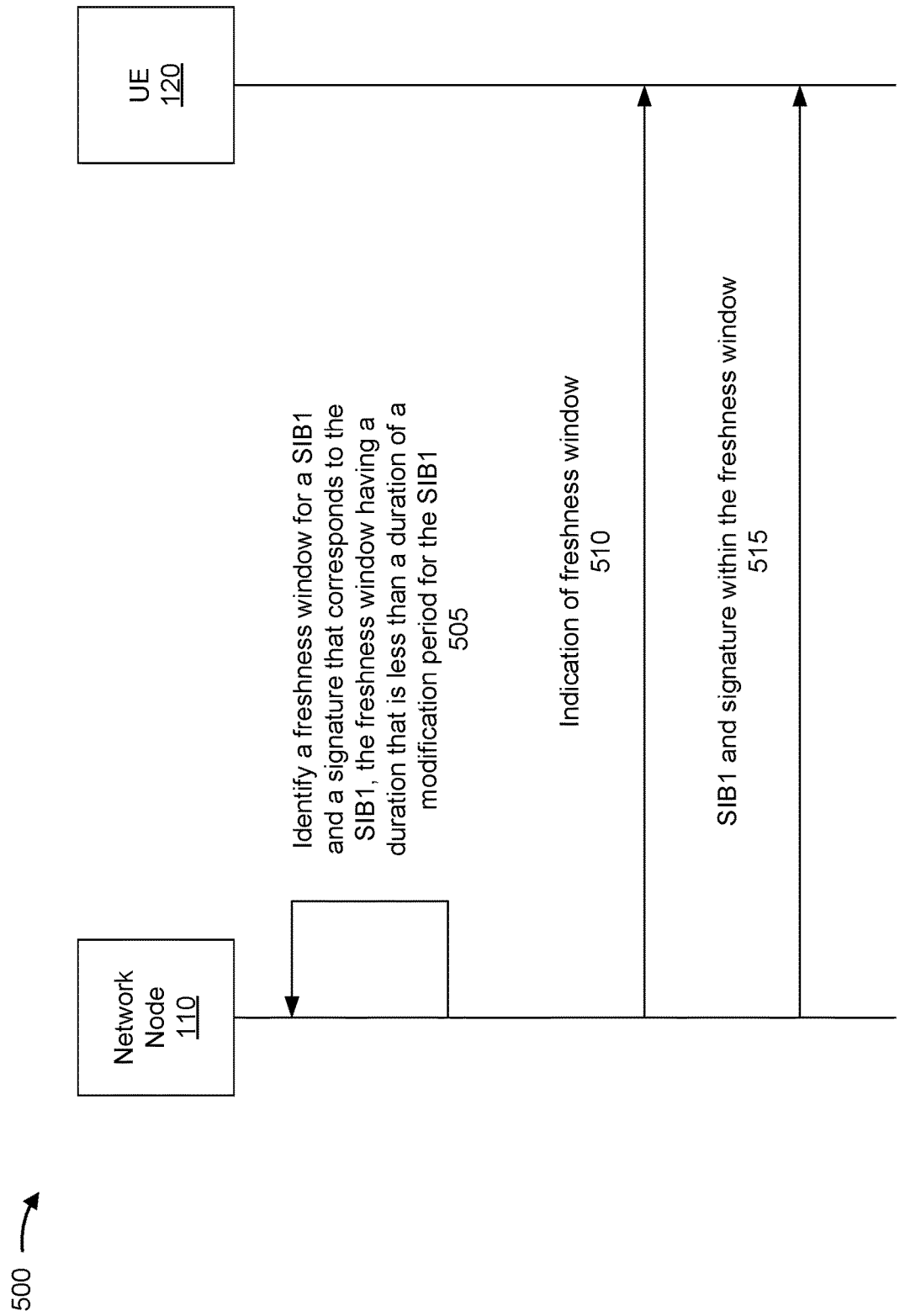
FIG. 5 is a diagram illustrating an example of a freshness window for a system information block (SIB) and signature, in accordance with the present disclosure.

FIG. 5 is a diagram illustrating an example 500 of a freshness window for a system information block and signature, in accordance with the present disclosure. The network node 110 may communicate with the UE 120. For example, the network node 110 may transmit, and the UE 120 may receive, a system information block such as a SIB1. In some aspects, the network node 110 may broadcast the SIB1, and the UE 120 may receive the SIB1 via the broadcast transmission. The network node 110 may be a valid network node or may be a false network node. The UE 120 may use the SIB1 and the signature to determine whether the network node 110 is the valid network node or the false network node. While the system information block is described herein as a SIB1, any type of SIB or master information block (MIB) may be used.

As shown by reference number 505, the network node 110 may identify a freshness window for the SIB1 and the signature that corresponds to the SIB1. The freshness window may have a duration that is less than a duration of a modification period for the SIB1. In some aspects, the freshness window may be based at least in part on a time period during which a payload associated with the SIB1 does not change (e.g., is static) or is not expected to change. In some aspects, the freshness window may be based at least in part on a time period during which the signature is sufficient to prevent replay attacks. For example, the freshness window may be based at least in part on a time period during which the signature is sufficient to prevent all replay attacks or a threshold number or percentage of replay attacks. In some aspects, the freshness window may be calculated based at least in part on a capability and/or attribute of the FNN that generates the replay attacks or is capable of generating the replay attacks, such as a location of the FNN or a baseband processing capability of the FNN, among other examples. In some aspects, the freshness window may be short enough to reduce the likelihood of replay attacks, but may be long enough to prevent large increases to system overhead. For example, a smaller freshness window may be more likely to prevent replay attacks but may require a larger number of signature calculations. In some aspects, the network node 110 may calculate the freshness window based at least in part on the modification period for the SIB1, the time period during which the payload associated with the SIB1 does not change or is not expected to change, the time period during which the signature is sufficient to prevent the number of percentage of replay attacks, and/or the capabilities or attributes of the FNN, among other examples.

In some aspects, the network node 110 may identify (e.g., calculate) the freshness window. The freshness window may have a duration that is based at least in part on a time during which a payload associated with the SIB1 does not change and during which the same signature (prepared for the SIB1) is sufficient to prevent replay attacks without updating the signature. In some aspects, the signature may be updated once (e.g., a single time) for each freshness window. The same signature may be transmitted M times over a freshness window that includes N SIB1 transmissions. In some aspects, the network node 110 may select M<N (with M as small as one) to reduce OTA overhead and network energy consumption. In some aspects, a delay of any UE 120 to verify the authenticity of a SIB1 may increase along with decreasing M (e.g., since UEs may need to wait longer to receive a signature when the signature transmissions are infrequent, such as with a smaller M). In this case, the network node 110 may select M based on the fraction of UEs 120 that are capable of verifying the signature (compared to legacy or low-end UEs that are not capable of verifying the signature) and the QoS requirements on low-latency services.

In some aspects, although the signature can be scheduled for any subframe or time slot within the freshness window, the signature may be scheduled at unused SIB1 repetition occasions. This may have a lower impact on already existing 5G scheduling occurrences. In one example, the SIB1 and the signature may be sent every 160 ms with a 20 ms gap between the SIB1 and the signature. In another example, to reduce OTA overhead and network energy consumption using M<N, the signature may be sent less frequently, such as every 320 ms or 480 ms, with a 20 ms gap between the SIB1 and the signature. In another example, the signature may be sent based on a fixed time raster (e.g., using static scheduling) that does not need to be periodic and can be selected by the network node 110 based on the overall traffic. The time raster may be indicated to the UE 120 dynamically (e.g., via downlink control information (DCI)) or semi-statically (via radio resource control (RRC)) if the UE 120 already has an established RRC.

In some aspects, the signature may be computed (e.g., re-computed) for a new freshness window, even if the SIB1 remains the same, but with a new freshness parameter. In some aspects, the freshness parameter may be a specific system frame number (SFN) in the freshness window, which may be indicated in DCI or a MIB/SIB1, or may be a predefined function of the current SFN. In some cases, a false network node may still succeed in sending an outdated SIB1 (with the signature) in future qualifying SFNs. In some aspects, the freshness parameter may be a timestamp. In one example, the timestamp may be associated with a start time of the freshness window, and may be sent OTA with each signature or may be indicated in the SIB1. In another example, the timestamp may be a low-resolution local time (e.g., considering a time-sync error between the network node 110 and the UE 120). The timestamp may be sent via RRC if the UE 120 already has an existing RRC connection.

In some aspects, the signature may be sent on a physical downlink shared channel (PDSCH) after being scrambled with an associated SIB1. The UE 120 may be configured to descramble the signature and SIB1 based at least in part on the UE 120 previously receiving the SIB1. In some aspects, the network node 110 may select signatures to send after being scrambled with the SIB1, and may indicate the scrambled signature and SIB1 to the UE 120 dynamically (via DCI), semi-statically (via RRC), or based on a fixed time raster.

In some aspects, if a public key to be used for verifying the signature is to be sent OTA along with a certificate (where the public key and the certificate are jointly referred to as "the key"), the transmission of the key can also be scheduled similarly to that of the signature. For example, the transmission of the key can be scheduled at unused SIB1 repetition occasions with a gap between the SIB1 and the key being different than the gap between the SIB1 and the signature. The key may be safely scheduled infrequently (e.g., some freshness windows may not include a key) because the same key can be used for a longer time period (compared to the signature) at the cost of delay considerations.

In some aspects, the signature may be computed using data bits associated with the SIB1 or using coded bits associated with the PDSCH for a freshness window. In some aspects, the network node 110 may compute the signature using the coded bits carried in the PDSCH. Since the coded bits in the PDSCH are different for each redundancy version (RV), the signature may be computed separately for each RV. This may result in different signatures associated with the same SIB1 payload. In one example, the network node 110 may send only one RV type, such as a self-decodable RV1 or RV3, to avoid computing the signature multiple times. Since the signature is to be sent OTA, the received signature at the UE 120 is likely to be impaired by observation noise. The use of a noisy signature and PDSCH may be more likely to fail the signature verification under an insufficient signal-to-noise ratio (SNR). Thus, the network node 110 may only generate the signature using the coded bits when the network node 110 determines that the SNR is sufficiently high.

In some aspects, the network node 110 may compute the signature based at least in part on the data bits in the SIB1 payload. In this case, the signature is computed once, and the coded bits are generated jointly for the concatenated SIB1 and signature. The network node 110 may send any RV type (e.g., self-decodable or not) as indicated in the DCI scheduling the PDSCH. The signature may not be directly impaired by the observation noise (since the coded bits are being sent OTA). The signature verification may use a decoded signature and SIB1, which may be likely to have fewer error bits and may lead to a higher chance of successful verification (in the case of a genuine SIB1 and signature). Additionally, or alternatively, the network node 110 may send different RVs to enable the UE 120 to soft-combine multiple PDSCHs to achieve fewer error bits to improve the signature verification. This may avoid an immediate invalid signature declaration. In some cases, ignoring capabilities (e.g., redundancy) via PHY waveforms may cause degraded verification performance.

In some aspects, a signature (or a scrambled SIB1 and signature) may be scheduled by a single physical downlink control channel (PDCCH) that is used to schedule the SIB1. If there are multiple future signature (or scrambled SIB1 and signature) repetitions, the same PDCCH may schedule all of them. In some aspects, each signature (or scrambled SIB1 and signature) repetition may be indicated in DCI. For example, each signature (or scrambled SIB1 and signature) repetition may be indicated in a new DCI field, such as KO for PDSCH scheduling and using a lookup table. Since the PDCCH is decoded just once, this may avoid multiple energy-consuming blind convolutions. In some aspects, legacy or low-end UEs (such as IoT UEs) which are not capable of verifying the signature may discard the new DCI fields. There is no impact on the MIB since there is no change on control resource set 0 (CORESET 0) or the common search space (CSS) for the PDCCH.

In some aspects, the signature (or scrambled SIB1 and signature) may be scheduled by a separate PDCCH than the PDCCH for the SIB1. The PDCCH scheduling the signature (or scrambled SIB1 and signature) may have a DCI payload with Format X (e.g., 10) that is scrambled by a new scrambling sequence that is based at least in part on a signature radio network temporary identifier (RNTI). In some aspects, multiple signature (or scrambled SIB1 and signature) repetitions may be scheduled by the same PDCCH, where each repetition is indicated by a new DCI field and there is no impact on MIB (since the search space is unchanged). Although the PDCCH scheduling all signature (or scrambled SIB1 and signature) repetitions is decoded just once, the UE 120 may decode two separate PDCCHs (e.g., one for SIB1 and another for the signature) so that energy consumption increases.

In some aspects, although both PDCCH types use the same search space, the UE may not mistakenly decode the signature (or scrambled SIB1 and signature) as the SIB1 because the signature (or scrambled SIB1 and signature) and the SIB1 are scheduled by separate PDCCHs. The legacy or low-end UEs (such as the IoT UEs), which are not capable of verifying the signature, may ignore the signature (or scrambled SIB1 and signature). Since both PDCCH types use the same search space, the PDCCH types may only be distinguished after blind deconvolution and cyclic redundancy check (CRC) checking with the correct scrambling type (e.g., SI RNTI or signature RNTI). As a result, the UEs (particularly legacy or low-end UEs) may unnecessarily decode the PDCCH scheduling the signature while seeking for the PDCCH that schedules SIB1. This may result in wasted energy resources by the UE 120.

In some aspects, the signature (or scrambled SIB1 and signature) may be scheduled by a separate PDCCH that is different from the PDCCH scheduling the SIB1 by using a different scrambling sequence and a different search space. The PDCCH scheduling the signature (or scrambled SIB1 and signature) may have the DCI payload with Format X (e.g., 1_0) scrambled by the new scrambling sequence that is based at least in part on the signature RNTI and may have a different common search space (e.g., CSS 0_1) than the PDCCH scheduling the SIB1. As a result, the UEs may seek for different PDCCH types (e.g., one for the SIB1 and another for the signature) in different search spaces, and (legacy or low-end) UEs may not unnecessarily decode a PDCCH that schedules the signatures while seeking for the PDCCH that schedules the SIB1. This may reduce or eliminate the wasted energy resources by the UE 120.

As shown by reference number 510, the network node 110 may transmit, and the UE 120 may receive, an indication of the freshness window. The indication of the freshness window may be transmitted via a broadcast transmission.

As shown by reference number 515, the network node 110 may transmit, and the UE 120 may receive, the SIB1 and the signature within the freshness window. The SIB1 and the signature may be transmitted within the freshness window via a broadcast transmission (e.g., another broadcast transmission). The UE 120 may verify whether the network node 110 is a genuine network node or a false network node based at least in part on the freshness window and the signature.

As described herein, a false network node may pose a threat using broadcast messages at any phase of communication and/or using unicast signaling (prior to authentication). For example, the false network node may transmit fake SI which may be generated from scratch or may be a modified or unmodified version of a previously transmitted genuine SI (e.g., for replay attack) to cause a DoS. In some cases, there may be no security protection (e.g., authenticity check) that enables the UE to distinguish between fake broadcast messages and genuine broadcast messages before relying on the enclosed payload in the broadcast message. This may result in the UE having reduced security and being vulnerable to replay attacks. Using the techniques and apparatuses described herein, a network node may identify a freshness window for a SIB and a signature that corresponds to the SIB. The freshness window may have a duration that is less than a duration of a modification period for the SIB. The network node may transmit the SIB and the signature to the UE within the freshness window. The UE may authenticate the SIB based at least in part on the signature and the freshness window. This may improve the security of the UE and may reduce a vulnerability of the UE to replay attacks.

As indicated above, FIG. 5 is provided as an example. Other examples may differ from what is described with regard to FIG. 5.

Figure 6A:
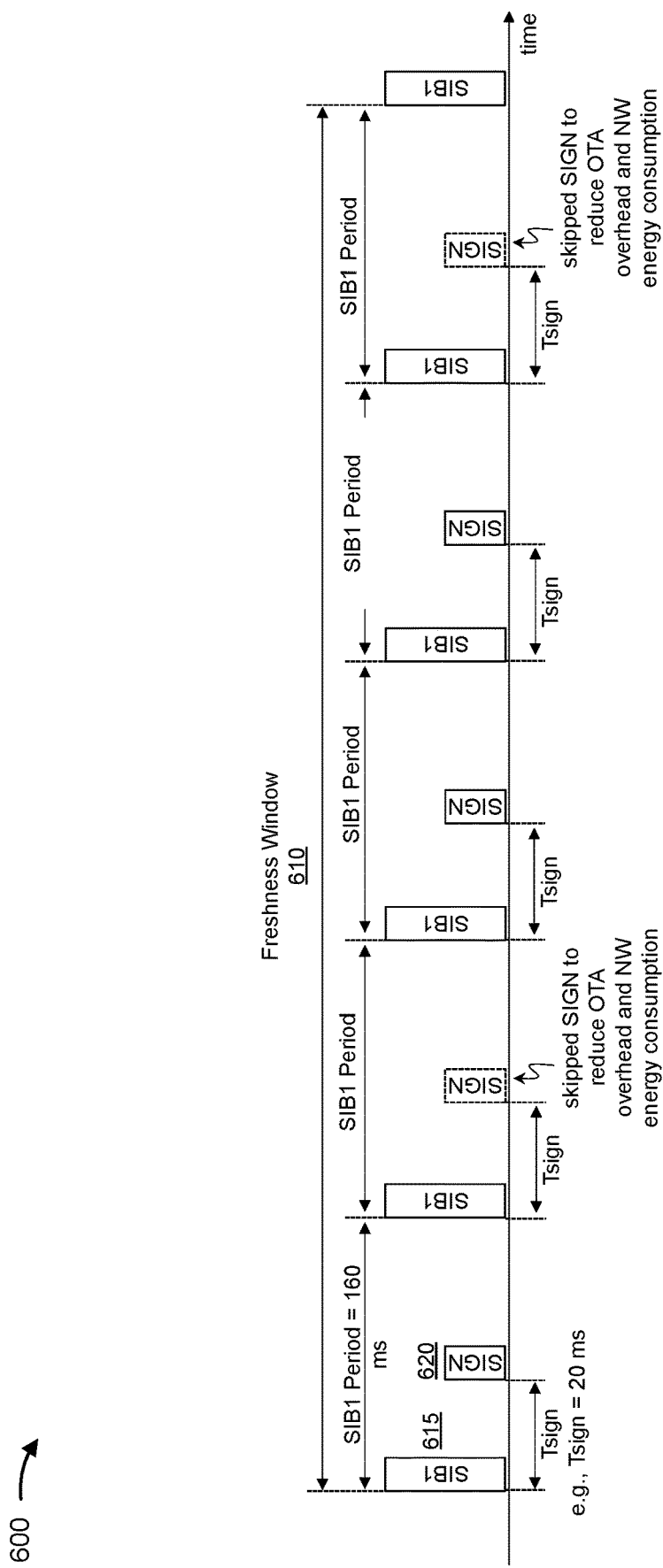
FIGS. 6A and 6B are diagrams illustrating examples of freshness windows for a SIB and signature, in accordance with the present disclosure.
Figure 6B:
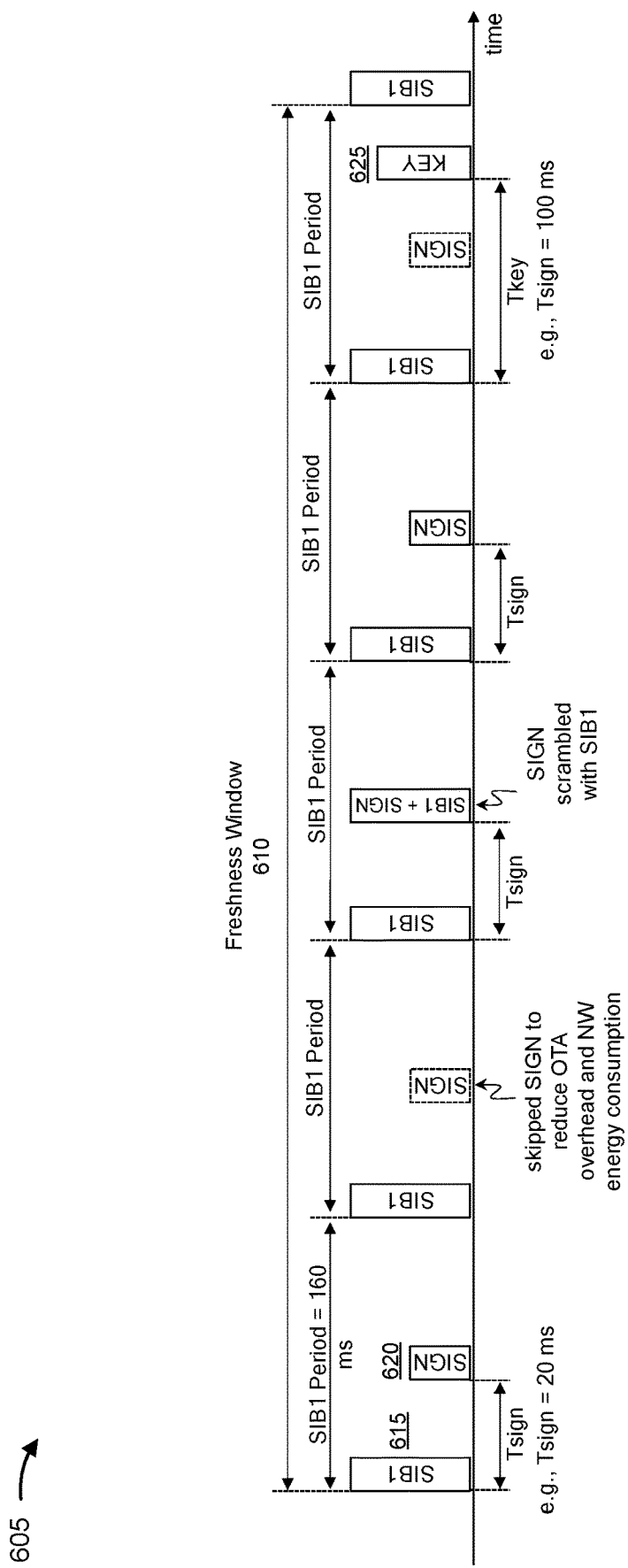

FIGS. 6A and 6B are diagrams illustrating examples 600 and 605 of freshness windows for a SIB and signature, in accordance with the present disclosure.

In some aspects, as shown in FIG. 6A, the network node 110 may identify (e.g., calculate) a freshness window, such as the freshness window 610. The freshness window 610 may have a duration that is based at least in part on a time during which a payload associated with a SIB1 (such as the SIB1 615) does not change and during which the same signature 620 (prepared for the SIB1 615) is sufficient to prevent replay attacks without updating the signature 620. In some aspects, the signature 620 may be updated once for each freshness window 610. The same signature 620 may be transmitted M times over a freshness window 610 that includes N SIB1 transmissions. In some aspects, the network node 110 may select M<N (with M as small as one) to reduce OTA overhead and network energy consumption. In some aspects, a delay of any UE 120 to verify the authenticity of SIB1 615 may increase along with decreasing M (e.g., since UEs may need to wait longer to receive a signature when the signature transmissions are infrequent, such as with a smaller M). In this case, the network node 110 may select M based on the fraction of UEs 120 that are capable of verifying the signature 620 (compared to legacy or low-end UEs that are not capable of verifying the signature) and the QoS requirements on low-latency services.

In some aspects, although the signature 620 can be scheduled for any subframe or time slot within the freshness window 610, the signature 620 may be scheduled at unused SIB1 repetition occasions. This may have a lower impact on already existing 5G scheduling occurrences. In one example, the SIB1 615 and the signature 620 may be sent every 160 ms with a 20 ms gap between the SIB1 615 and the signature 620. In another example, to reduce OTA overhead and network energy consumption using M<N, the signature 620 may be sent less frequently, such as every 320 ms or 480 ms, with a 20 ms gap between the SIB1 615 and the signature 620. In another example, the signature 620 may be sent based on a fixed time raster (e.g., using static scheduling) that does not need to be periodic and can be selected by the network node 110 based on the overall traffic. The time raster may be indicated to the UE 120 dynamically (e.g., via DCI) or semi-statically (via RRC) if the UE 120 already has an established RRC.

In some aspects, the signature 620 may be computed (e.g., re-computed) for a new freshness window 610, even if the SIB1 615 remains the same, but with a new freshness parameter. In some aspects, the freshness parameter may be a specific SFN in the freshness window 610, which may be indicated in DCI or a MIB/SIB1, or may be a predefined function of the current SFN. In some cases, a false network node may still succeed in sending an outdated SIB1 615 (with the signature 620) in future qualifying SFNs. In some aspects, the freshness parameter may be a timestamp. In one example, the timestamp may be associated with a start time of the freshness window 610, and may be sent OTA with each signature 620 or may be indicated in the SIB1 615. In another example, the timestamp may be a low-resolution local time (e.g., considering a time-sync error between the network node 110 and the UE 120). The timestamp may be sent via RRC if the UE 120 already has an existing RRC connection.

In some aspects, the signature 620 may be sent on a PDSCH after being scrambled with an associated SIB1 615. The UE 120 may be configured to descramble the signature 620 and SIB1 615 based at least in part on the UE 120 previously receiving the SIB1 615. In some aspects, the network node 110 may select signatures to send after being scrambled with the SIB1 615, and may indicate the scrambled signature 620 and SIB1 615 to the UE 120 dynamically (via DCI), semi-statically (via RRC), or based on a fixed time raster.

In some aspects, as shown in FIG. 6B, if a public key to be used for verifying the signature 620 is to be sent OTA along with a certificate (where the public key and the certificate are jointly referred to as the key 625), the transmission of the key 625 can also be scheduled similarly to that of the signature 620. For example, the transmission of the key 625 can be scheduled at unused SIB1 repetition occasions with a gap between the SIB1 615 and the key 625 being different than the gap between the SIB1 615 and the signature 620. The key 625 may be safely scheduled infrequently (e.g., some freshness windows may not include a key) because the same key 625 can be used for a longer time period (compared to the signature 620) at the cost of delay considerations.

As indicated above, FIGS. 6A and 6B are provided as examples. Other examples may differ from what is described with regard to FIGS. 6A and 6B.

Figure 7A:
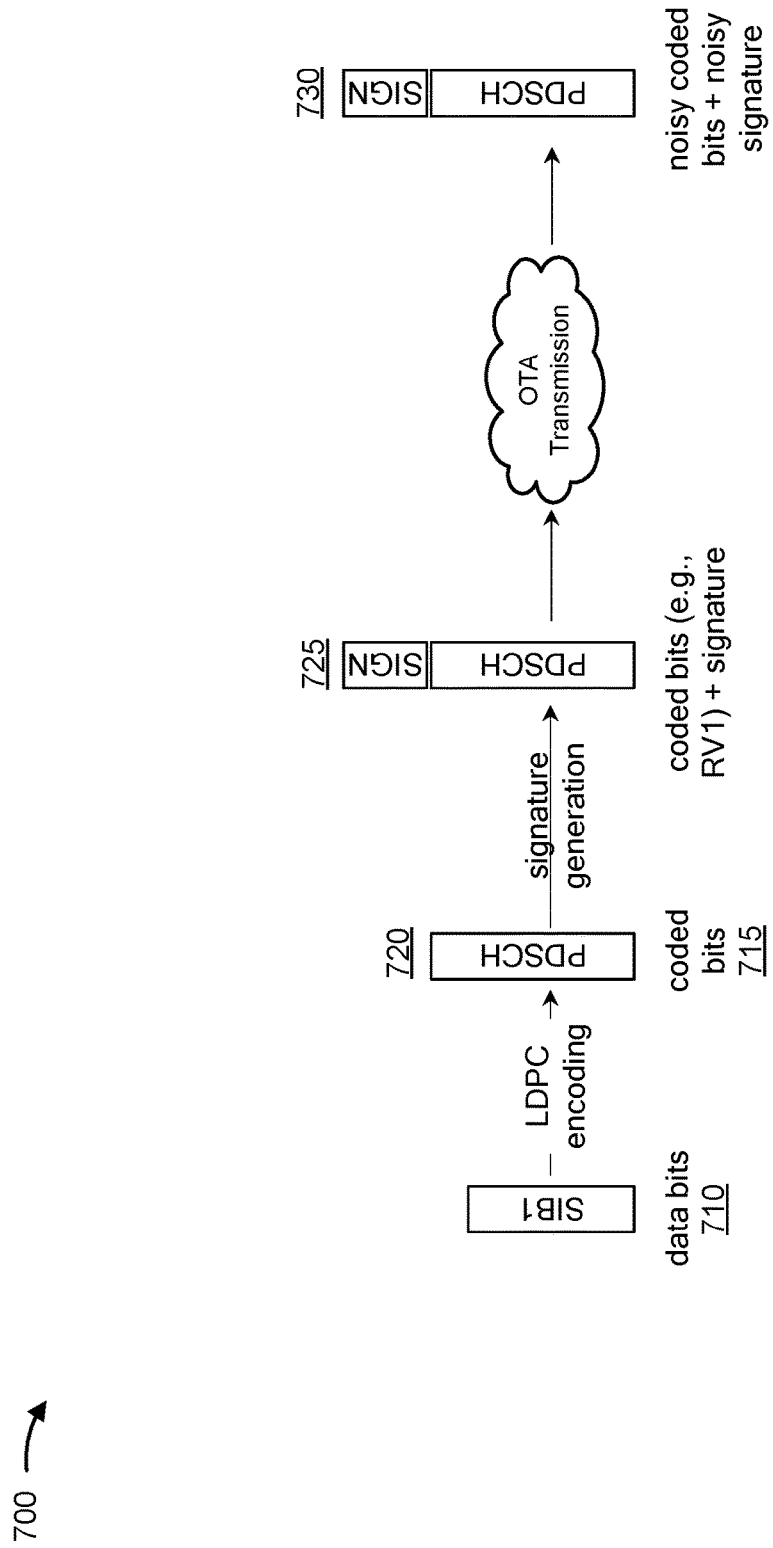
FIGS. 7A and 7B are diagrams illustrating examples of freshness windows for a SIB and signature, in accordance with the present disclosure.
Figure 7B:
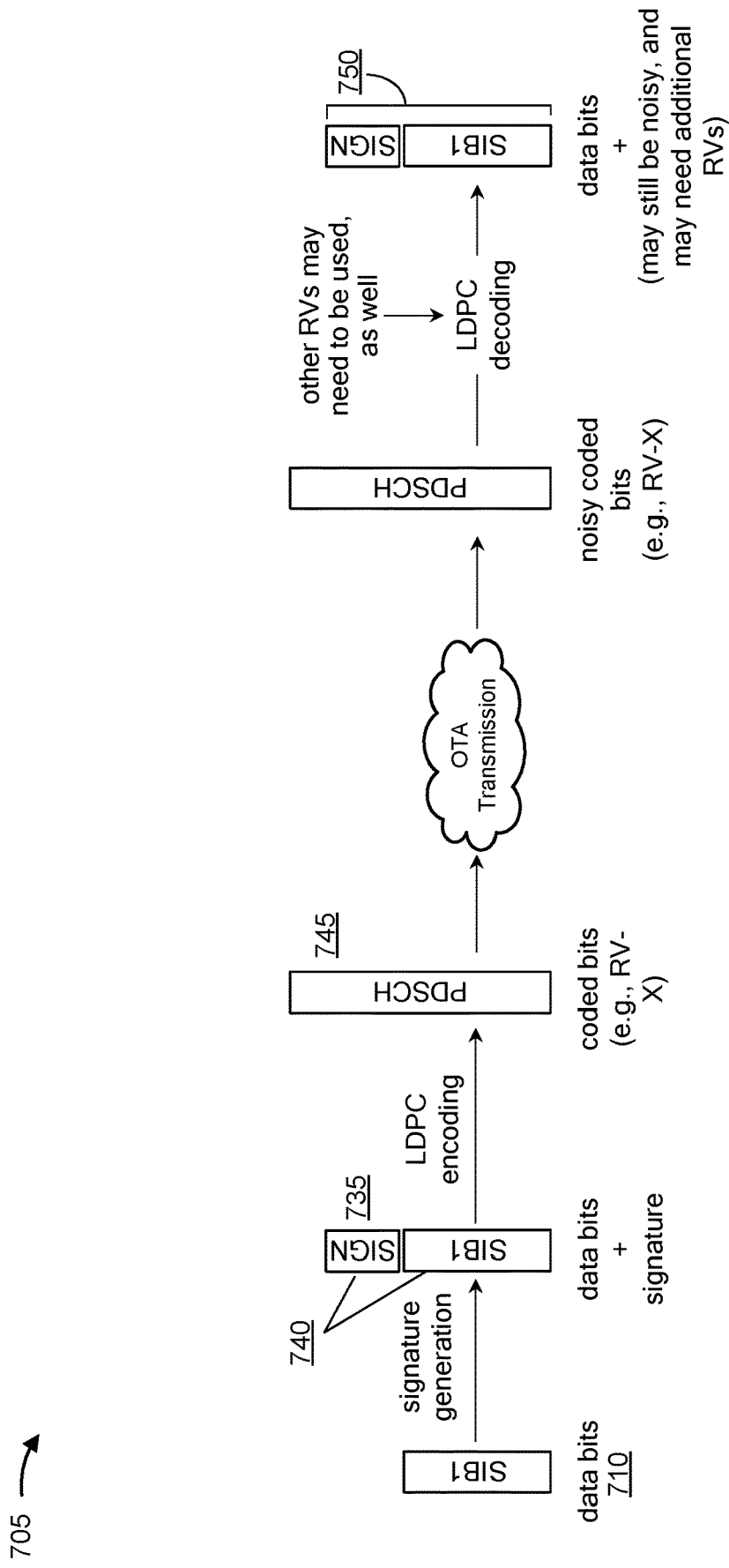

FIGS. 7A and 7B are diagrams illustrating examples 700 and 705 of freshness windows for a SIB and signature, in accordance with the present disclosure.

In some aspects, as shown in FIG. 7A, a signature may be computed using data bits 710 associated with a SIB1 or using coded bits 715 associated with a PDSCH 720 for a freshness window. In some aspects, the network node 110 may compute the signature 725 using the coded bits 715 carried in the PDSCH 720. Since the coded bits 715 in the PDSCH 720 are different for each redundancy version (RV), the signature 725 may be computed separately for each RV. This may result in different signatures associated with the same SIB1 payload. In one example, the network node 110 may sent only one RV type, such as a self-decodable RV1 or RV3, to avoid computing the signature 725 multiple times. Since the signature 725 is to be sent OTA, the received signature 730 at the UE 120 is likely to be impaired by observation noise. The use of a noisy signature and PDSCH may be more likely to fail the signature verification under an insufficient SNR. Thus, the network node 110 may only generate the signature 725 using the coded bits 715 when the network node 110 determines that the SNR is sufficiently high.

In some aspects, as shown in FIG. 7B, the network node 110 may compute a signature 735 based at least in part on the data bits 710 in a SIB1 payload. In this case, the signature 735 is computed once, and the coded bits are generated jointly for a concatenated SIB1 and signature 740. The network node 110 may send any RV type (e.g., self-decodable or not) as indicated in the DCI scheduling the PDSCH 745. The signature 735 may not be directly impaired by the observation noise (since the coded bits are being sent OTA). The signature verification may use a decoded signature and SIB1 750, which may be likely to have fewer error bits and may lead to a higher chance of successful verification (in the case of a genuine SIB1 and signature). Additionally, or alternatively, the network node 110 may send different RVs to enable the UE 120 to soft-combine multiple PDSCHs to achieve fewer error bits to improve the signature verification. This may avoid an immediate invalid signature declaration. In some cases, ignoring capabilities (e.g., redundancy) via PHY waveforms may cause degraded verification performance.

As indicated above, FIGS. 7A and 7B are provided as examples. Other examples may differ from what is described with regard to FIGS. 7A and 7B.

Figure 8:
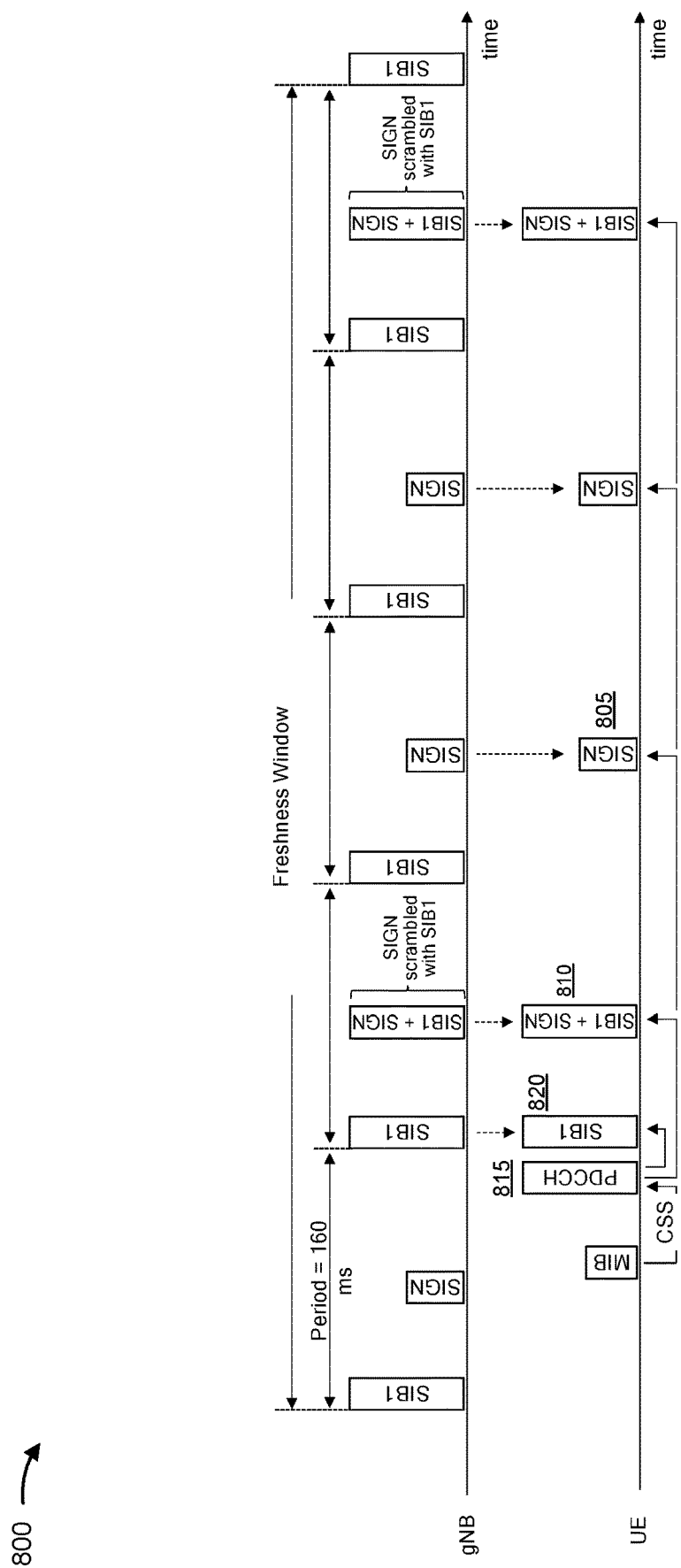
FIG. 8 is a diagram illustrating an example of a freshness window for a SIB and signature, in accordance with the present disclosure.

FIG. 8 is a diagram illustrating an example 800 of a freshness window for a SIB and signature, in accordance with the present disclosure.

In some aspects, a signature 805 (or a scrambled SIB1 and signature 810) may be scheduled by a single PDCCH 815 that is used to schedule a SIB1 820. If there are multiple future signature (or scrambled SIB1 and signature) repetitions, the same PDCCH 815 may schedule all of them. In some aspects, each signature 805 (or scrambled SIB1 and signature 810) repetition may be indicated in DCI. For example, each signature 805 (or scrambled SIB1 and signature 810) repetition may be indicated in a new DCI field, such as KO for PDSCH scheduling and using a lookup table. Since the PDCCH 815 is decoded just once, this may avoid multiple energy-consuming blind convolutions. In some aspects, legacy or low-end UEs (such as IoT UEs) which are not capable of verifying the signature may discard the new DCI fields. There is no impact on the MIB since there is no change on CORESET 0 or the CSS for the PDCCH 815.

As indicated above, FIG. 8 is provided as an example. Other examples may differ from what is described with regard to FIG. 8.

Figure 9:
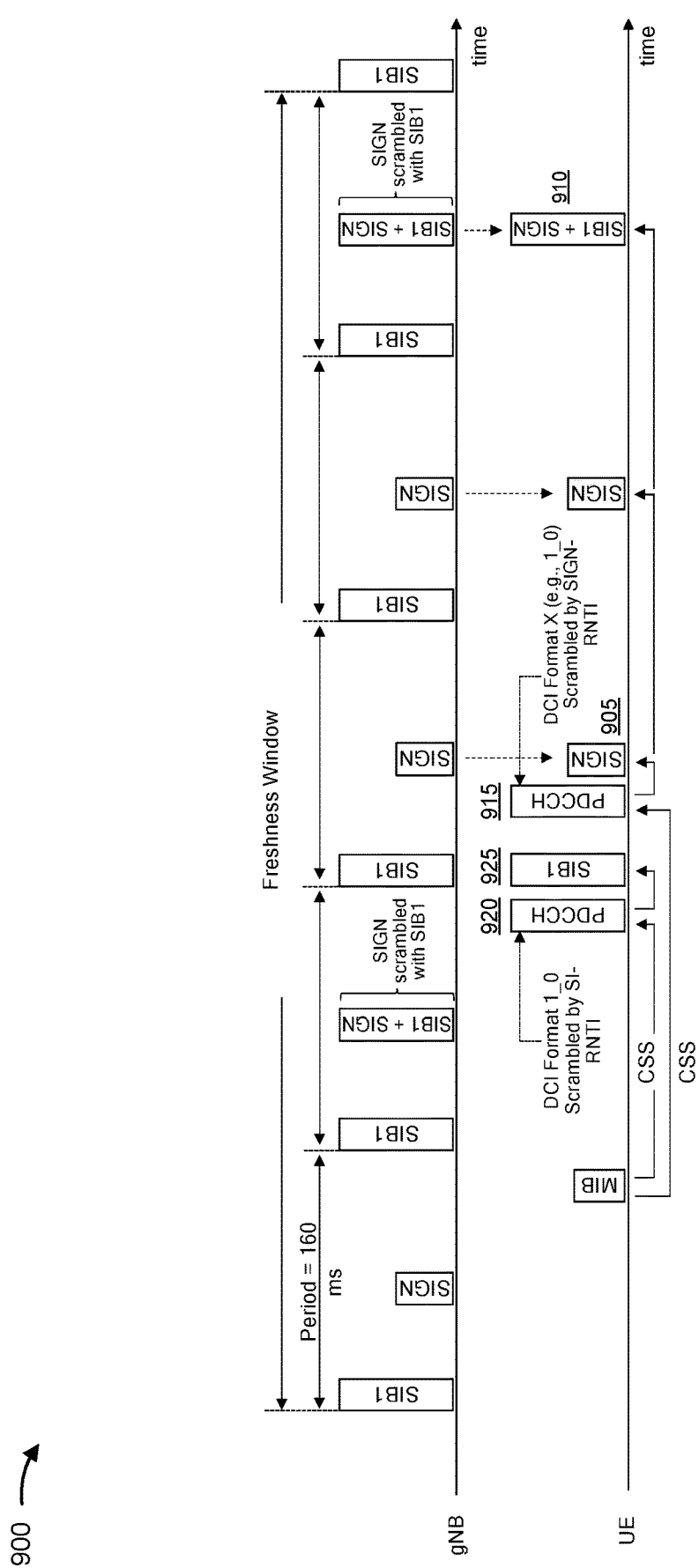
FIG. 9 is a diagram illustrating an example of a freshness window for a SIB and signature, in accordance with the present disclosure.

FIG. 9 is a diagram illustrating an example 900 of a freshness window for a SIB and signature, in accordance with the present disclosure.

In some aspects, a signature 905 (or scrambled SIB1 and signature 910) may be scheduled by a separate PDCCH 915 than the PDCCH 920 for the SIB1 925. The PDCCH 915 scheduling the signature 905 (or scrambled SIB1 and signature 910) may have a DCI payload with Format X (e.g., 10) that is scrambled by a new scrambling sequence that is based at least in part on a signature RNTI. In some aspects, multiple signature (or scrambled SIB1 and signature) repetitions may be scheduled by the same PDCCH 915, where each repetition is indicated by a new DCI field and there is no impact on MIB (since the search space is unchanged). Although the PDCCH 915 scheduling all signature (or scrambled SIB1 and signature) repetitions is decoded just once, the UE 120 may decode two separate PDCCHs (e.g., PDCCH 920 for SIB1 and PDCCH 915 for the signature) so that energy consumption increases.

In some aspects, although both PDCCH types use the same search space, the UE may not mistakenly decode the signature 905 (or scrambled SIB1 and signature 910) as the SIB1 925 because the signature 905 (or scrambled SIB1 and signature 910) and the SIB1 925 are scheduled by separate PDCCHs. The legacy or low-end UEs (such as the IoT UEs), which are not capable of verifying the signature 905, may ignore the signature 905 (or scrambled SIB1 and signature 910). Since both PDCCH types (e.g., PDCCH 915 and PDCCH 920) use the same search space, the PDCCH types may only be distinguished after blind deconvolution and CRC checking with the correct scrambling type (e.g., SI RNTI or signature RNTI). As a result, the UEs (particularly legacy or low-end UEs) may unnecessarily decode the PDCCH 915 scheduling the signature while seeking for the PDCCH 920 that schedules SIB1 925. This may result in wasted energy resources by the UE 120.

As indicated above, FIG. 9 is provided as an example. Other examples may differ from what is described with regard to FIG. 9.

Figure 10:
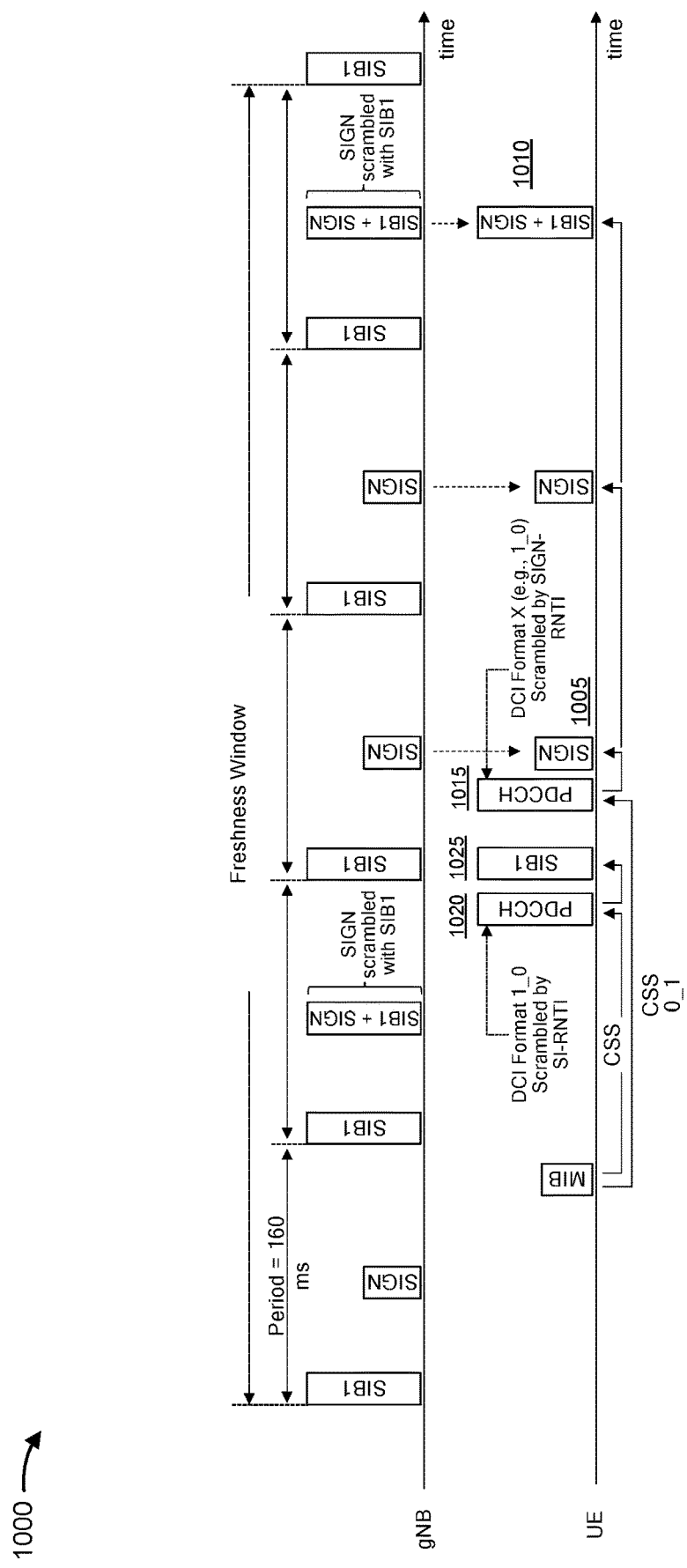
FIG. 10 is a diagram illustrating an example of a freshness window for a SIB and signature, in accordance with the present disclosure.

FIG. 10 is a diagram illustrating an example 1000 of a freshness window for a SIB and signature, in accordance with the present disclosure.

In some aspects, a signature 1005 (or scrambled SIB1 and signature 1010) may be scheduled by a separate PDCCH 1015 that is different from the PDCCH 1020 scheduling the SIB1 1025 by using a different scrambling sequence and a different search space. The PDCCH 1015 scheduling the signature 1005 (or scrambled SIB1 and signature 1010) may have the DCI payload with Format X (e.g., 1_0) scrambled by the new scrambling sequence that is based at least in part on the signature RNTI and may have a different common search space (e.g., CSS 0_1) than the PDCCH 1020 scheduling the SIB1 1025. As a result, the UEs may seek for different PDCCH types (e.g., PDCCH 1015 and PDCCH 1020) in different search spaces, and (legacy or low-end) UEs may not unnecessarily decode a PDCCH 1015 that schedules the signatures while seeking for the PDCCH 1020 that schedules the SIB1 1025. This may reduce or eliminate the wasted energy resources by the UE 120.

As indicated above, FIG. 10 is provided as an example. Other examples may differ from what is described with regard to FIG. 10.

Figure 11:
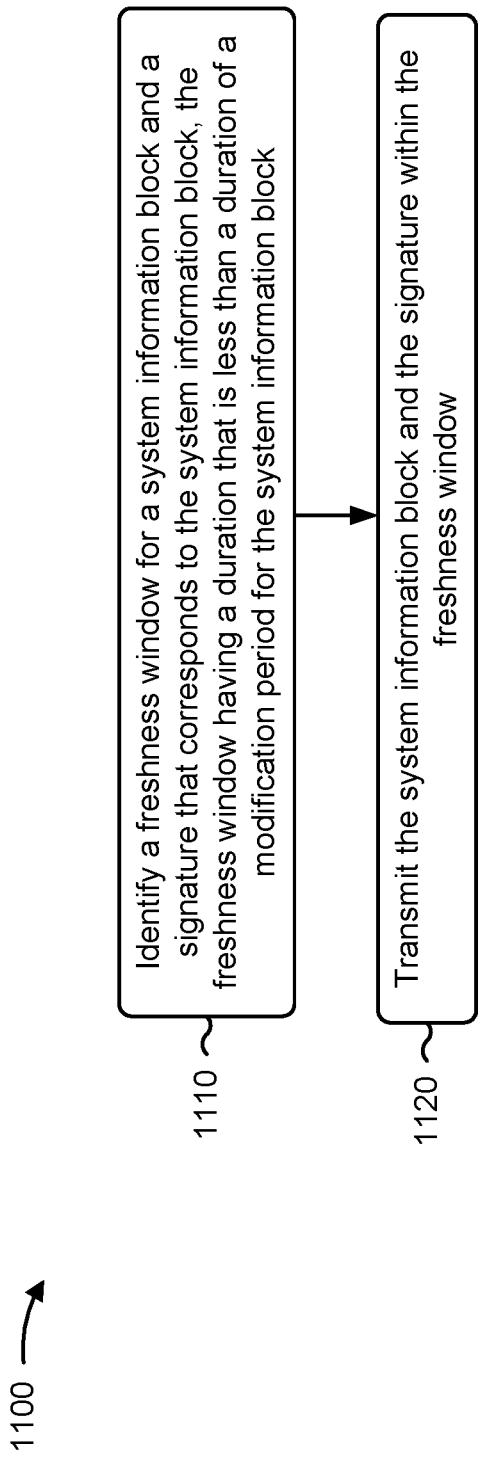
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with a freshness window for a system information block and signature.

As shown in FIG. 11, in some aspects, process 1100 may include identifying a freshness window for a system information block and a signature that corresponds to the system information block, the freshness window having a duration that is less than a duration of a modification period for the system information block (block 1110). For example, the network node (e.g., using communication manager 150 and/or identification component 1308, depicted in FIG. 13) may identify a freshness window for a system information block and a signature that corresponds to the system information block, the freshness window having a duration that is less than a duration of a modification period for the system information block, as described above.

As further shown in FIG. 11, in some aspects, process 1100 may include transmitting the system information block and the signature within the freshness window (block 1120). For example, the network node (e.g., using communication manager 150 and/or transmission component 1304, depicted in FIG. 13) may transmit the system information block and the signature within the freshness window, as described above.

Process 1100 may include additional aspects, such as any single aspect or any combination of aspects described below and/or in connection with one or more other processes described elsewhere herein.

In a first aspect, the system information block is a system information block type one.

In a second aspect, alone or in combination with the first aspect, process 1100 includes generating a single signature that is valid for the time period.

In a third aspect, alone or in combination with one or more of the first and second aspects, transmitting the system information block and the signature within the freshness window comprises transmitting a first number of system information blocks within the freshness window and transmitting a second number of signatures within the freshness window, wherein the first number is greater than the second number.

In a fourth aspect, alone or in combination with one or more of the first through third aspects, process 1100 includes determining the second number of signatures based at least in part on one or more characteristics of a subset of UEs, of a plurality of UEs, that are capable of verifying the signature.

In a fifth aspect, alone or in combination with one or more of the first through fourth aspects, transmitting the system information block and the signature comprises transmitting the signature at an unused system information block repetition occasion.

In a sixth aspect, alone or in combination with one or more of the first through fifth aspects, process 1100 includes generating another signature to be used during another freshness window, wherein the system information block is the same in the freshness window and the other freshness window, and the other signature includes at least one parameter that is different from a parameter associated with the signature.

In a seventh aspect, alone or in combination with one or more of the first through sixth aspects, the at least one parameter is a system frame number or a timestamp.

In an eighth aspect, alone or in combination with one or more of the first through seventh aspects, process 1100 includes scrambling the system information block and the signature to generate a scrambled system information block and signature, wherein transmitting the system information block and the signature comprises transmitting the scrambled system information block and signature via a physical downlink shared channel.

In a ninth aspect, alone or in combination with one or more of the first through eighth aspects, process 1100 includes transmitting information associated with the scrambled system information block and signature via downlink control information, via a radio resource control message, or using a fixed time raster.

In a tenth aspect, alone or in combination with one or more of the first through ninth aspects, process 1100 includes transmitting a public key that is configured to be used for verifying the signature.

In an eleventh aspect, alone or in combination with one or more of the first through tenth aspects, transmitting the public key comprises transmitting the public key at an unused system information block repetition occasion using a gap that is different than a gap associated with the signature.

In a twelfth aspect, alone or in combination with one or more of the first through eleventh aspects, process 1100 includes generating the signature based at least in part on one or more coded bits that are carried in a physical downlink shared channel.

In a thirteenth aspect, alone or in combination with one or more of the first through twelfth aspects, generating the signature comprises generating a different signature for each redundancy version of a plurality of redundancy versions of the one or more coded bits.

In a fourteenth aspect, alone or in combination with one or more of the first through thirteenth aspects, process 1100 includes generating the signature based at least in part on one or more data bits included in the system information block.

In a fifteenth aspect, alone or in combination with one or more of the first through fourteenth aspects, generating the signature comprises generating a single signature within the freshness window, wherein one or more coded bits are generated jointly for the system information block and the signature.

In a sixteenth aspect, alone or in combination with one or more of the first through fifteenth aspects, the signature, or a scrambled system information block and signature, is scheduled using a single physical downlink control channel transmission.

In a seventeenth aspect, alone or in combination with one or more of the first through sixteenth aspects, the single physical downlink control channel transmission schedules a plurality of repetitions of the signature or a plurality of repetitions of the scrambled system information block and signature, and each repetition of the signature or repetition of the scrambled system information block and signature is indicated in a downlink control information field.

In an eighteenth aspect, alone or in combination with one or more of the first through seventeenth aspects, each signature or scrambled system information block and signature, of a plurality of signatures or scrambled system information blocks and signatures, is scheduled using a respective separate physical downlink control channel transmission that is different than a physical downlink control channel transmission used to schedule the system information block.

In a nineteenth aspect, alone or in combination with one or more of the first through eighteenth aspects, a physical downlink control channel transmission that schedules a signature or a scrambled system information block and signature has a downlink control information payload that uses a format that is scrambled by a scrambling sequence that is based at least in part on a signature radio network temporary identifier.

In a twentieth aspect, alone or in combination with one or more of the first through nineteenth aspects, a plurality of repetitions of the signature or a plurality of repetitions of the scrambled system information block and signature is scheduled by a same physical downlink control channel transmission, wherein each signature repetition or scrambled system information block and signature repetition is indicated in a downlink control information field.

In a twenty-first aspect, alone or in combination with one or more of the first through twentieth aspects, a physical downlink control channel transmission that schedules a signature or a scrambled system information block is different than a physical downlink control channel transmission that schedules the system information block.

In a twenty-second aspect, alone or in combination with one or more of the first through twenty-first aspects, the physical downlink control channel transmission that schedules the signature or the scrambled system information block and signature has a downlink control information payload that is scrambled by a scrambling sequence that is based at least in part on a signature radio network temporary identifier and a common search space.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
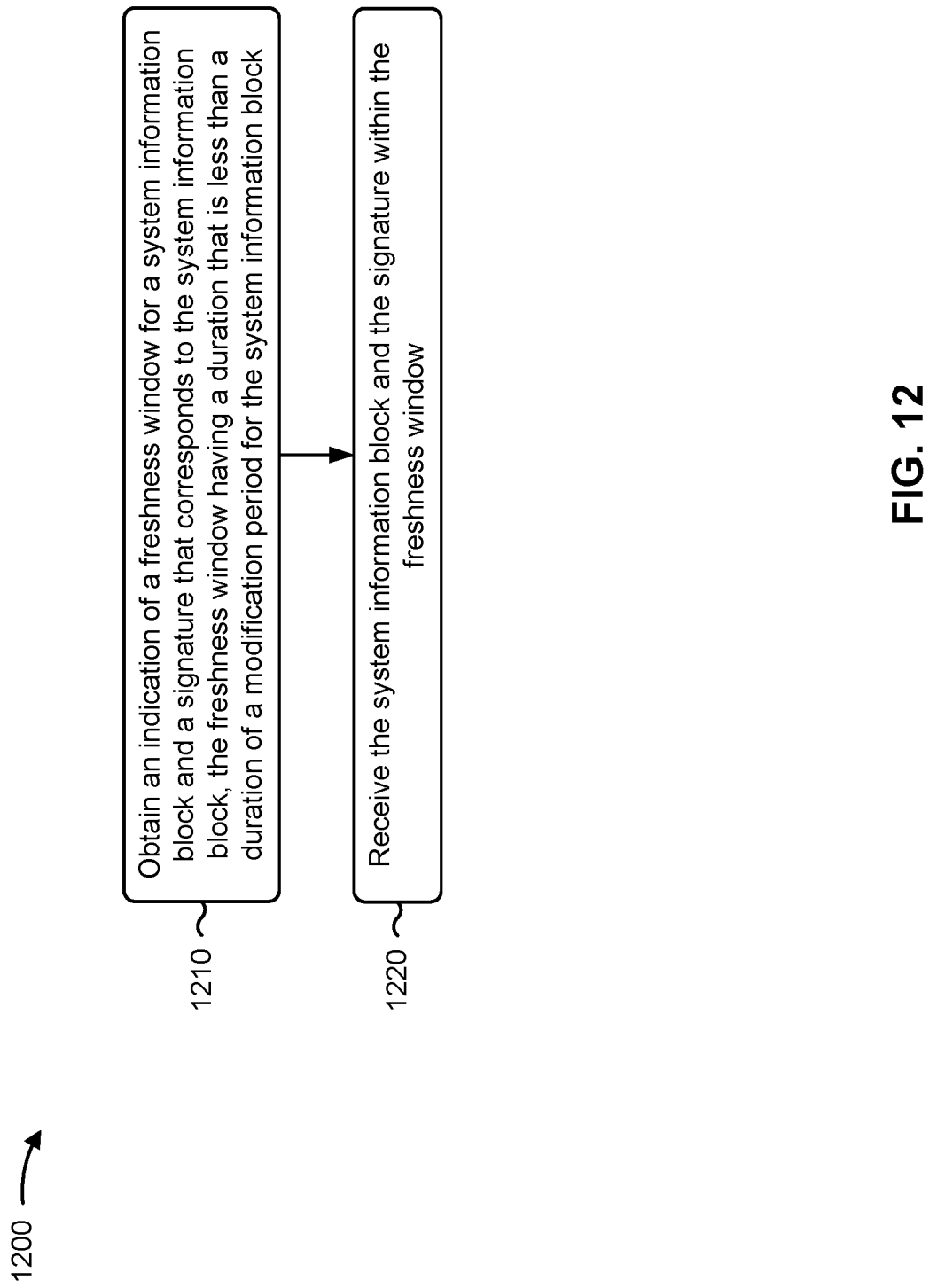
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with a freshness window for a system information block and signature.

As shown in FIG. 12, in some aspects, process 1200 may include obtaining an indication of a freshness window for a system information block and a signature that corresponds to the system information block, the freshness window having a duration that is less than a duration of a modification period for the system information block (block 1210). For example, the UE (e.g., using communication manager 140 and/or obtaining component 1408, depicted in FIG. 14) may obtain an indication of a freshness window for a system information block and a signature that corresponds to the system information block, the freshness window having a duration that is less than a duration of a modification period for the system information block, as described above.

As further shown in FIG. 12, in some aspects, process 1200 may include receiving the system information block and the signature within the freshness window (block 1220). For example, the UE (e.g., using communication manager 140 and/or reception component 1402, depicted in FIG. 14)

may receive the system information block and the signature within the freshness window, as described above.

Process 1200 may include additional aspects, such as any single aspect or any combination of aspects described below and/or in connection with one or more other processes described elsewhere herein.

In a first aspect, the system information block is a system information block type one.

In a second aspect, alone or in combination with the first aspect, a single signature is valid for the time period.

In a third aspect, alone or in combination with one or more of the first and second aspects, receiving the system information block and the signature within the freshness window comprises receiving a first number of system information blocks within the freshness window and receiving a second number of signatures within the freshness window, wherein the first number is greater than the second number.

In a fourth aspect, alone or in combination with one or more of the first through third aspects, the second number of signatures is based at least in part on one or more characteristics of a subset of UEs, of a plurality of UEs that includes the UE, that are capable of verifying the signature.

In a fifth aspect, alone or in combination with one or more of the first through fourth aspects, receiving the system information block and the signature comprises receiving the signature at an unused system information block repetition occasion.

In a sixth aspect, alone or in combination with one or more of the first through fifth aspects, the system information block and the signature are scrambled to generate a scrambled system information block and signature, wherein receiving the system information block and the signature comprises receiving the scrambled system information block and signature via a physical downlink shared channel.

In a seventh aspect, alone or in combination with one or more of the first through sixth aspects, process 1200 includes receiving information associated with the scrambled system information block and signature via downlink control information, via a radio resource control message, or using a fixed time raster.

In an eighth aspect, alone or in combination with one or more of the first through seventh aspects, process 1200 includes receiving a public key that is configured to be used for verifying the signature.

In a ninth aspect, alone or in combination with one or more of the first through eighth aspects, receiving the public key comprises receiving the public key at an unused system information block repetition occasion using a gap that is different than a gap associated with the signature.

In a tenth aspect, alone or in combination with one or more of the first through ninth aspects, the signature is generated based at least in part on one or more coded bits that are carried in a physical downlink shared channel.

In an eleventh aspect, alone or in combination with one or more of the first through tenth aspects, the signature is generated based at least in part on one or more data bits included in the system information block.

In a twelfth aspect, alone or in combination with one or more of the first through eleventh aspects, the signature, or a scrambled system information block and signature, is scheduled using a single physical downlink control channel transmission.

In a thirteenth aspect, alone or in combination with one or more of the first through twelfth aspects, the single physical downlink control channel transmission schedules a plurality of repetitions of the signature or a plurality of repetitions of the scrambled system information block and signature, and each repetition of the signature or scrambled system information block and signature repetition is indicated in a downlink control information field.

In a fourteenth aspect, alone or in combination with one or more of the first through thirteenth aspects, each signature or scrambled system information block and signature, of a plurality of signatures or scrambled system information blocks and signatures, is scheduled using a respective separate physical downlink control channel transmission that is different than a physical downlink control channel transmission used to schedule the system information block.

In a fifteenth aspect, alone or in combination with one or more of the first through fourteenth aspects, a physical downlink control channel transmission that schedules a signature or a scrambled system information block and signature has a downlink control information payload that uses a format that is scrambled by a scrambling sequence that is based at least in part on a signature radio network temporary identifier.

In a sixteenth aspect, alone or in combination with one or more of the first through fifteenth aspects, a plurality of repetitions of the signature or a plurality of repetitions of the scrambled system information block and signature is scheduled by a same physical downlink control channel transmission, wherein each signature repetition or scrambled system information block and signature repetition is indicated in a downlink control information field.

In a seventeenth aspect, alone or in combination with one or more of the first through sixteenth aspects, a physical downlink control channel transmission that schedules a signature or a scrambled system information block is different than a physical downlink control channel transmission that schedules the system information block.

In an eighteenth aspect, alone or in combination with one or more of the first through seventeenth aspects, the physical downlink control channel transmission that schedules the signature or the scrambled system information block and signature has a downlink control information payload that is scrambled by a scrambling sequence that is based at least in part on a signature radio network temporary identifier and a common search space.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
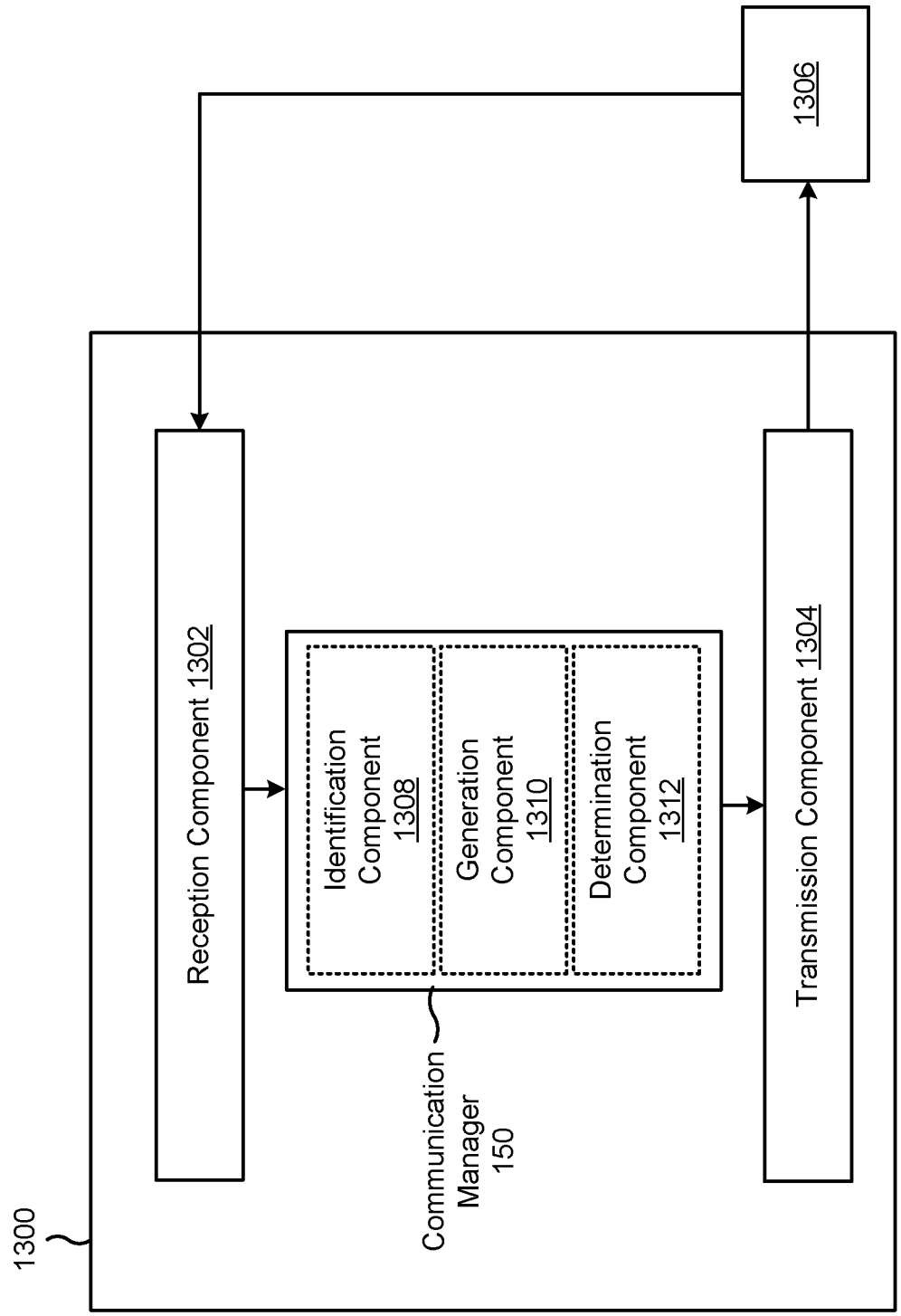
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include one or more of an identification component 1308, a generation component 1310, or a determination component 1312, among other examples.

In some aspects, the apparatus 1300 may be configured to perform one or more operations described herein in connection with FIGS. 5-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The identification component 1308 may identify a freshness window for a system information block and a signature that corresponds to the system information block, the freshness window having a duration that is less than a duration of a modification period for the system information block. The transmission component 1304 may transmit the system information block and the signature within the freshness window.

The generation component 1310 may generate a single signature that is valid for the time period. The determination component 1312 may determine the second number of signatures based at least in part on one or more characteristics of a subset of UEs, of a plurality of UEs, that are capable of verifying the signature. The generation component 1310 may generate another signature to be used during another freshness window, wherein the system information block is the same in the freshness window and the other freshness window, and the other signature includes at least one parameter that is different from a parameter associated with the signature. The generation component 1310 may scramble the system information block and the signature to generate a scrambled system information block and signature, wherein transmitting the system information block and the signature comprises transmitting the scrambled system information block and signature via a physical downlink shared channel. The transmission component 1304 may transmit information associated with the scrambled system information block and signature via downlink control information, via a radio resource control message, or using a fixed time raster. The transmission component 1304 may transmit a public key that is configured to be used for verifying the signature. The generation component 1310 may generate the signature based at least in part on one or more coded bits that are carried in a physical downlink shared channel. The generation component 1310 may generate the signature based at least in part on one or more data bits included in the system information block.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
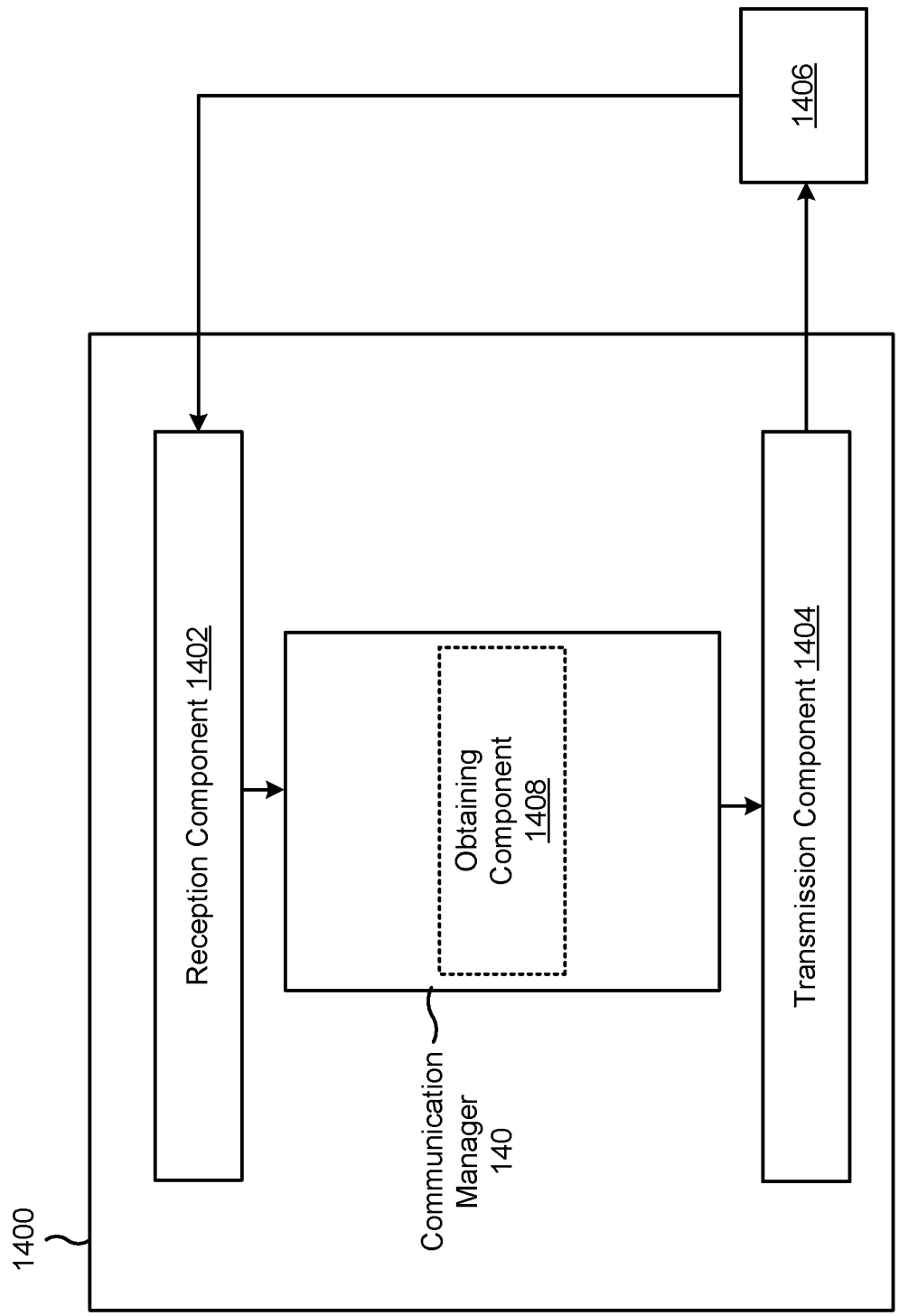
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include an obtaining component 1408, among other examples.

In some aspects, the apparatus 1400 may be configured to perform one or more operations described herein in connection with FIGS. 5-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The obtaining component 1408 may obtain an indication of a freshness window for a system information block and a signature that corresponds to the system information block, the freshness window having a duration that is less than a duration of a modification period for the system information block. The reception component 1402 may receive the system information block and the signature within the freshness window.

The reception component 1402 may receive information associated with the scrambled system information block and signature via downlink control information, via a radio resource control message, or using a fixed time raster. The reception component 1402 may receive a public key that is configured to be used for verifying the signature.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a network node, comprising: identifying a freshness window for a system information block and a signature that corresponds to the system information block, the freshness window having a duration that is less than a duration of a modification period for the system information block; and transmitting the system information block and the signature within the freshness window.

Aspect 2: The method of Aspect 1, wherein the system information block is a system information block type one and the freshness window is based at least in part on a time period during which a payload associated with the system information block is static.

Aspect 3: The method of any of Aspects 1-2, further comprising generating a single signature that is valid for the time period.

Aspect 4: The method of any of Aspects 1-3, wherein transmitting the system information block and the signature within the freshness window comprises transmitting a first number of system information blocks within the freshness window and transmitting a second number of signatures within the freshness window, wherein the first number is greater than the second number.

Aspect 5: The method of Aspect 4, further comprising determining the second number of signatures based at least in part on one or more characteristics of a subset of user equipments, of a plurality of user equipments, that are capable of verifying the signature.

Aspect 6: The method of any of Aspects 1-5, wherein transmitting the system information block and the signature comprises transmitting the signature at an unused system information block repetition occasion.

Aspect 7: The method of any of Aspects 1-6, further comprising generating another signature to be used during another freshness window, wherein the system information block is the same in the freshness window and the other freshness window, and the other signature includes at least one parameter that is different from a parameter associated with the signature.

Aspect 8: The method of Aspect 7, wherein the at least one parameter is a system frame number or a timestamp.

Aspect 9: The method of any of Aspects 1-8, further comprising scrambling the system information block and the signature to generate a scrambled system information block and signature, wherein transmitting the system information block and the signature comprises transmitting the scrambled system information block and signature via a physical downlink shared channel.

Aspect 10: The method of Aspect 9, further comprising transmitting information associated with the scrambled system information block and signature via downlink control information, via a radio resource control message, or using a fixed time raster.

Aspect 11: The method of any of Aspects 1-10, further comprising transmitting a public key that is configured to be used for verifying the signature.

Aspect 12: The method of Aspect 11, wherein transmitting the public key comprises transmitting the public key at an unused system information block repetition occasion using a gap that is different than a gap associated with the signature.

Aspect 13: The method of any of Aspects 1-12, further comprising generating the signature based at least in part on one or more coded bits that are carried in a physical downlink shared channel.

Aspect 14: The method of Aspect 13, wherein generating the signature comprises generating a different signature for each redundancy version of a plurality of redundancy versions of the one or more coded bits.

Aspect 15: The method of any of Aspects 1-14, further comprising generating the signature based at least in part on one or more data bits included in the system information block.

Aspect 16: The method of Aspect 15, wherein generating the signature comprises generating a single signature within the freshness window, wherein one or more coded bits are generated jointly for the system information block and the signature.

Aspect 17: The method of any of Aspects 1-16, wherein the signature, or a scrambled system information block and signature, is scheduled using a single physical downlink control channel transmission.

Aspect 18: The method of Aspect 17, wherein the single physical downlink control channel transmission schedules a plurality of repetitions of the signature or a plurality of repetitions of the scrambled system information block and signature, and each repetition of the signature or repetition of the scrambled system information block and signature is indicated in a downlink control information field.

Aspect 19: The method of any of Aspects 1-18, wherein each signature or scrambled system information block and signature, of a plurality of signatures or scrambled system information blocks and signatures, is scheduled using a respective separate physical downlink control channel transmission that is different than a physical downlink control channel transmission used to schedule the system information block.

Aspect 20: The method of Aspect 19, wherein a physical downlink control channel transmission that schedules a signature or a scrambled system information block and signature has a downlink control information payload that uses a format that is scrambled by a scrambling sequence that is based at least in part on a signature radio network temporary identifier.

Aspect 21: The method of Aspect 20, wherein a plurality of repetitions of the signature or a plurality of repetitions of the scrambled system information block and signature is scheduled by a same physical downlink control channel transmission, wherein each signature repetition or scrambled system information block and signature repetition is indicated in a downlink control information field.

Aspect 22: The method of any of Aspects 1-21, wherein a physical downlink control channel transmission that schedules a signature or a scrambled system information block is different than a physical downlink control channel transmission that schedules the system information block.

Aspect 23: The method of Aspect 22, wherein the physical downlink control channel transmission that schedules the signature or the scrambled system information block and signature has a downlink control information payload that is scrambled by a scrambling sequence that is based at least in part on a signature radio network temporary identifier and a common search space.

Aspect 24: A method of wireless communication performed by a user equipment (UE), comprising: obtaining an indication of a freshness window for a system information block and a signature that corresponds to the system information block, the freshness window having a duration that is less than a duration of a modification period for the system information block; and receiving the system information block and the signature within the freshness window.

Aspect 25: The method of Aspect 24, wherein the system information block is a system information block type one and the freshness window is based at least in part on a time period during which a payload associated with the system information block is static.

Aspect 26: The method of any of Aspects 24-25, wherein a single signature is valid for the time period.

Aspect 27: The method of any of Aspects 24-26, wherein receiving the system information block and the signature within the freshness window comprises receiving a first number of system information blocks within the freshness window and receiving a second number of signatures within the freshness window, wherein the first number is greater than the second number.

Aspect 28: The method of Aspect 27, wherein the second number of signatures is based at least in part on one or more characteristics of a subset of UEs, of a plurality of UEs that includes the UE, that are capable of verifying the signature.

Aspect 29: The method of any of Aspects 24-28, wherein receiving the system information block and the signature comprises receiving the signature at an unused system information block repetition occasion.

Aspect 30: The method of any of Aspects 24-29, wherein the system information block and the signature are scrambled to generate a scrambled system information block and signature, wherein receiving the system information block and the signature comprises receiving the scrambled system information block and signature via a physical downlink shared channel.

Aspect 31: The method of Aspect 30, further comprising receiving information associated with the scrambled system information block and signature via downlink control information, via a radio resource control message, or using a fixed time raster.

Aspect 32: The method of any of Aspects 24-31, further comprising receiving a public key that is configured to be used for verifying the signature.

Aspect 33: The method of Aspect 32, wherein receiving the public key comprises receiving the public key at an unused system information block repetition occasion using a gap that is different than a gap associated with the signature.

Aspect 34: The method of any of Aspects 24-33, wherein the signature is generated based at least in part on one or more coded bits that are carried in a physical downlink shared channel.

Aspect 35: The method of any of Aspects 24-34, wherein the signature is generated based at least in part on one or more data bits included in the system information block.

Aspect 36: The method of any of Aspects 24-35, wherein the signature, or a scrambled system information block and signature, is scheduled using a single physical downlink control channel transmission.

Aspect 37: The method of Aspect 36, wherein the single physical downlink control channel transmission schedules a plurality of repetitions of the signature or a plurality of repetitions of the scrambled system information block and signature, and each repetition of the signature or scrambled system information block and signature repetition is indicated in a downlink control information field.

Aspect 38: The method of any of Aspects 24-37, wherein each signature or scrambled system information block and signature, of a plurality of signatures or scrambled system information blocks and signatures, is scheduled using a respective separate physical downlink control channel transmission that is different than a physical downlink control channel transmission used to schedule the system information block.

Aspect 39: The method of Aspect 38, wherein a physical downlink control channel transmission that schedules a signature or a scrambled system information block and signature has a downlink control information payload that uses a format that is scrambled by a scrambling sequence that is based at least in part on a signature radio network temporary identifier.

Aspect 40: The method of Aspect 39, wherein a plurality of repetitions of the signature or a plurality of repetitions of the scrambled system information block and signature is scheduled by a same physical downlink control channel transmission, wherein each signature repetition or scrambled system information block and signature repetition is indicated in a downlink control information field.

Aspect 41: The method of any of Aspects 24-40, wherein a physical downlink control channel transmission that schedules a signature or a scrambled system information block is different than a physical downlink control channel transmission that schedules the system information block.

Aspect 42: The method of Aspect 41, wherein the physical downlink control channel transmission that schedules the signature or the scrambled system information block and signature has a downlink control information payload that is scrambled by a scrambling sequence that is based at least in part on a signature radio network temporary identifier and a common search space.

Aspect 43: An apparatus for wireless communication at a device, comprising a processor; memory coupled with the processor; and instructions stored in the memory and executable by the processor to cause the apparatus to perform the method of one or more of Aspects 1-42.

Aspect 44: A device for wireless communication, comprising a memory and one or more processors coupled to the memory, the one or more processors configured to perform the method of one or more of Aspects 1-42.

Aspect 45: An apparatus for wireless communication, comprising at least one means for performing the method of one or more of Aspects 1-42.

Aspect 46: A non-transitory computer-readable medium storing code for wireless communication, the code comprising instructions executable by a processor to perform the method of one or more of Aspects 1-42.

Aspect 47: A non-transitory computer-readable medium storing a set of instructions for wireless communication, the set of instructions comprising one or more instructions that, when executed by one or more processors of a device, cause the device to perform the method of one or more of Aspects 1-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
   a memory; and
   one or more processors, coupled to the memory, configured to:
   identify, a freshness window, the freshness window for a system information block and a signature that corresponds to the system information block, the freshness window having a duration that is less than a duration of a modification period for the system information block, wherein the duration of the freshness window is based at least in part on a time period during which a payload associated with the system information block does not change; and
   transmit the system information block and the identified signature within the freshness window, wherein the identified signature is transmitted fewer times within the freshness window than the system information block is transmitted within the freshness window.

2. The apparatus of claim 1, wherein the system information block is a system information block type one.

3. The apparatus of claim 1, wherein the one or more processors are further configured to generate a single signature that is valid for the time period.

4. The apparatus of claim 1, wherein the one or more processors are further configured to determine a number of signatures based at least in part on one or more characteristics of a subset of user equipments, of a plurality of user equipments, that are capable of verifying the signature.

5. The apparatus of claim 1, wherein the one or more processors, to transmit the system information block and the signature, are configured to transmit the signature at an unused system information block repetition occasion.

6. The apparatus of claim 1, wherein the one or more processors are further configured to generate another signature to be used during another freshness window, wherein the system information block is the same in the freshness window and the other freshness window, and the other signature includes at least one parameter that is different from a parameter associated with the signature, wherein the at least one parameter is a system frame number or a timestamp.

7. The apparatus of claim 1, wherein the one or more processors are further configured to scramble the system information block and the signature to generate a scrambled system information block and a scrambled signature, wherein transmitting the system information block and the signature comprises transmitting the scrambled system information block and the scrambled signature via a physical downlink shared channel.

8. The apparatus of claim 1, wherein the one or more processors are further configured to transmit a public key that is configured to be used for verifying the signature, wherein the one or more processors, to transmit the public key, are configured to transmit the public key at an unused system information block repetition occasion using a gap that is different than a gap associated with the signature.

9. The apparatus of claim 1, wherein the one or more processors are further configured to generate the signature based at least in part on one or more coded bits that are carried in a physical downlink shared channel.

10. The apparatus of claim 1, wherein the one or more processors are further configured to generate the signature based at least in part on one or more data bits included in the system information block.

11. The apparatus of claim 1, wherein the signature, or a scrambled system information block and a scrambled signature, is scheduled using a single physical downlink control channel transmission.

12. The apparatus of claim 11, wherein the single physical downlink control channel transmission schedules a plurality of repetitions of the signature or a plurality of repetitions of the scrambled system information block and the scrambled signature, and each repetition of the signature or repetition of the scrambled system information block and the scrambled signature is indicated in a downlink control information field.

13. The apparatus of claim 1, wherein each signature or scrambled system information block and scrambled signature, of a plurality of signatures or scrambled system information blocks and scrambled signatures, is scheduled using a respective separate physical downlink control channel transmission that is different than a physical downlink control channel transmission used to schedule the system information block.

14. The apparatus of claim 13, wherein a physical downlink control channel transmission that schedules the signature or a scrambled system information block and a scrambled signature has a downlink control information payload that uses a format that is scrambled by a scrambling sequence that is based at least in part on a signature radio network temporary identifier.

15. The apparatus of claim 1, wherein a physical downlink control channel transmission that schedules the signature or a scrambled system information block is different than a physical downlink control channel transmission that schedules the system information block, wherein the physical downlink control channel transmission that schedules the signature or the scrambled system information block and scrambled signature has a downlink control information payload that is scrambled by a scrambling sequence that is based at least in part on a signature radio network temporary identifier and a common search space.

16. The apparatus of claim 1, wherein the freshness window is based at least in part on a capability or an attribute of a false network node (FNN) that is capable of generating replay attacks.

17. The apparatus of claim 1, wherein the freshness window is based at least in part on a time period during which the signature prevents a threshold number or a threshold percentage of replay attacks.

18. An apparatus for wireless communication at a user equipment (UE), comprising:
a memory; and
one or more processors, coupled to the memory, configured to:
obtain, an indication of a freshness window, the freshness window for a system information block and a signature that corresponds to the system information block, the freshness window having a duration that is less than a duration of a modification period for the system information block, wherein the duration of the freshness window is based at least in part on a time period during which a payload associated with the system information block does not change; and
receive the system information block and the obtained signature within the freshness window, wherein the obtained signature is received fewer times within the freshness window than the system information block is received within the freshness window.

19. The apparatus of claim 18, wherein the system information block is a system information block type one.

20. The apparatus of claim 18, wherein a single signature is valid for the time period.

21. The apparatus of claim 18, wherein a number of signatures is based at least in part on one or more characteristics of a subset of UEs, of a plurality of UEs that includes the UE, that are capable of verifying the signature.

22. The apparatus of claim 18, wherein the one or more processors, to receive the system information block and the signature, are configured to receive the signature at an unused system information block repetition occasion.

23. The apparatus of claim 18, wherein the system information block and the signature are scrambled to generate a scrambled system information block and a scrambled signature, wherein receiving the system information block and the signature comprises receiving the scrambled system information block and the scrambled signature via a physical downlink shared channel.

24. The apparatus of claim 18, wherein the one or more processors are further configured to receive a public key that is configured to be used for verifying the signature, wherein the one or more processors, to receive the public key, are configured to receive the public key at an unused system information block repetition occasion using a gap that is different than a gap associated with the signature.

25. The apparatus of claim 18, wherein the signature is generated based at least in part on one or more coded bits that are carried in a physical downlink shared channel.

26. The apparatus of claim 18, wherein the signature is generated based at least in part on one or more data bits included in the system information block.

27. The apparatus of claim 18, wherein the signature, or a scrambled system information block and a scrambled signature, is scheduled using a single physical downlink control channel transmission, wherein the single physical downlink control channel transmission schedules a plurality of repetitions of the signature or a plurality of repetitions of the scrambled system information block and the scrambled signature, and each repetition of the signature or scrambled system information block and scrambled signature repetition is indicated in a downlink control information field.

28. The apparatus of claim 18, wherein each signature or scrambled system information block and scrambled signature, of a plurality of signatures or scrambled system information blocks and scrambled signatures, is scheduled using a respective separate physical downlink control channel transmission that is different than a physical downlink control channel transmission used to schedule the system information block.

29. A method of wireless communication performed by a network node, comprising:
- identifying, a freshness window, the freshness window for a system information block and a signature that corresponds to the system information block, the freshness window having a duration that is less than a duration of a modification period for the system information block, wherein the duration of the freshness window is based at least in part on a time period during which a payload associated with the system information block does not change; and
- transmitting the system information block and the identified signature within the freshness window, wherein the identified signature is transmitted fewer times within the freshness window than the system information block is transmitted within the freshness window.

30. A method of wireless communication performed by a user equipment (UE), comprising:
- obtaining, an indication of a freshness window, the freshness window for a system information block and a signature that corresponds to the system information block, the freshness window having a duration that is less than a duration of a modification period for the system information block, wherein the duration of the freshness window is based at least in part on a time period during which a payload associated with the system information block does not change; and
- receiving the system information block and the obtained signature within the freshness window, wherein the obtained signature is received fewer times within the freshness window than the system information block is received within the freshness window.

* * * * *